United States Patent
Fukushima

(10) Patent No.: US 7,575,727 B2
(45) Date of Patent: Aug. 18, 2009

(54) CATALYTIC CONVERTER AND METHOD FOR MANUFACTURING THE SAME

(75) Inventor: Koji Fukushima, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 595 days.

(21) Appl. No.: 10/416,340

(22) PCT Filed: Nov. 9, 2001

(86) PCT No.: PCT/JP01/09837

§ 371 (c)(1),
(2), (4) Date: May 12, 2003

(87) PCT Pub. No.: WO02/38922

PCT Pub. Date: May 16, 2002

(65) Prior Publication Data

US 2004/0022699 A1  Feb. 5, 2004

(30) Foreign Application Priority Data

| Nov. 10, 2000 | (JP) | 2000-343349 |
| Nov. 10, 2000 | (JP) | 2000-343350 |
| Nov. 10, 2000 | (JP) | 2000-343352 |

(51) Int. Cl.
*B01D 50/00* (2006.01)

(52) U.S. Cl. .................................... 422/179

(58) Field of Classification Search ............... 422/177, 422/179, 180; 428/77, 78, 116, 920, 297.1, 428/298.1–300
See application file for complete search history.

(56) References Cited

U.S. PATENT DOCUMENTS

| 3,892,537 | A | * | 7/1975 | Gulati et al. ................ 422/179 |
| 4,265,953 | A | * | 5/1981 | Close ........................... 428/78 |
| 4,344,921 | A |  | 8/1982 | Santiago et al. |
| 4,698,213 | A | * | 10/1987 | Shimozi et al. ............. 422/179 |
| 4,782,661 | A | * | 11/1988 | Motley et al. ................ 60/299 |
| 5,008,086 | A | * | 4/1991 | Merry ........................ 422/180 |
| 5,413,766 | A | * | 5/1995 | Dattge et al. ................ 422/173 |
| 6,116,022 | A |  | 9/2000 | Woodward |
| 6,185,820 | B1 | * | 2/2001 | Foster .......................... 29/890 |
| 6,231,818 | B1 | * | 5/2001 | TenEyck ..................... 422/179 |
| 6,521,193 | B1 | * | 2/2003 | Hijikata et al. .............. 422/179 |
| 6,759,015 | B2 | * | 7/2004 | Peisert ........................ 422/179 |
| 2004/0234428 | A1 |  | 11/2004 | Tanahashi et al. |
| 2006/0278323 | A1 |  | 12/2006 | Eguchi |

(Continued)

FOREIGN PATENT DOCUMENTS

DE  39 39 392  6/1990

(Continued)

*Primary Examiner*—Tom Duong
(74) *Attorney, Agent, or Firm*—Oblon, Spivak, McClelland, Maier & Neustadt, P.C.

(57) ABSTRACT

A catalytic converter includes a catalyst carrier, a metal shell covering the outer periphery of the catalyst carrier, and a holding and sealing material disposed between the catalyst carrier and the metal shell. The holding and sealing material is a beltlike holding and sealing material having a width equal to or smaller than one-half the length of the catalyst carrier. The holding and sealing material is wound around the outer periphery of the catalyst carrier by one turn or more. By using the holding and sealing material, the catalytic converter can be produced inexpensively and easily.

17 Claims, 15 Drawing Sheets

U.S. PATENT DOCUMENTS

| | | |
|---|---|---|
| 2007/0207069 A1 | 9/2007 | Kariya et al. |
| 2007/0231222 A1 | 10/2007 | Okabe |
| 2007/0292318 A1 | 12/2007 | Andoh et al. |
| 2008/0044317 A1 | 2/2008 | Kariya et al. |
| 2008/0047638 A1 | 2/2008 | Sugino |

FOREIGN PATENT DOCUMENTS

| | | |
|---|---|---|
| DE | 197 14 851 | 10/1998 |
| EP | 639701 | 2/1995 |
| EP | 810353 A1 * | 12/1997 |
| EP | 997618 A2 * | 5/2000 |
| JP | 52015/1984 | 4/1984 |
| JP | 61-28710 | 2/1986 |
| JP | 61-98910 | 5/1986 |
| JP | 2-291416 | 12/1990 |
| JP | 09264126 A * | 10/1997 |
| WO | 99/40300 | 8/1999 |
| WO | WO 00/57041 | 9/2000 |

* cited by examiner

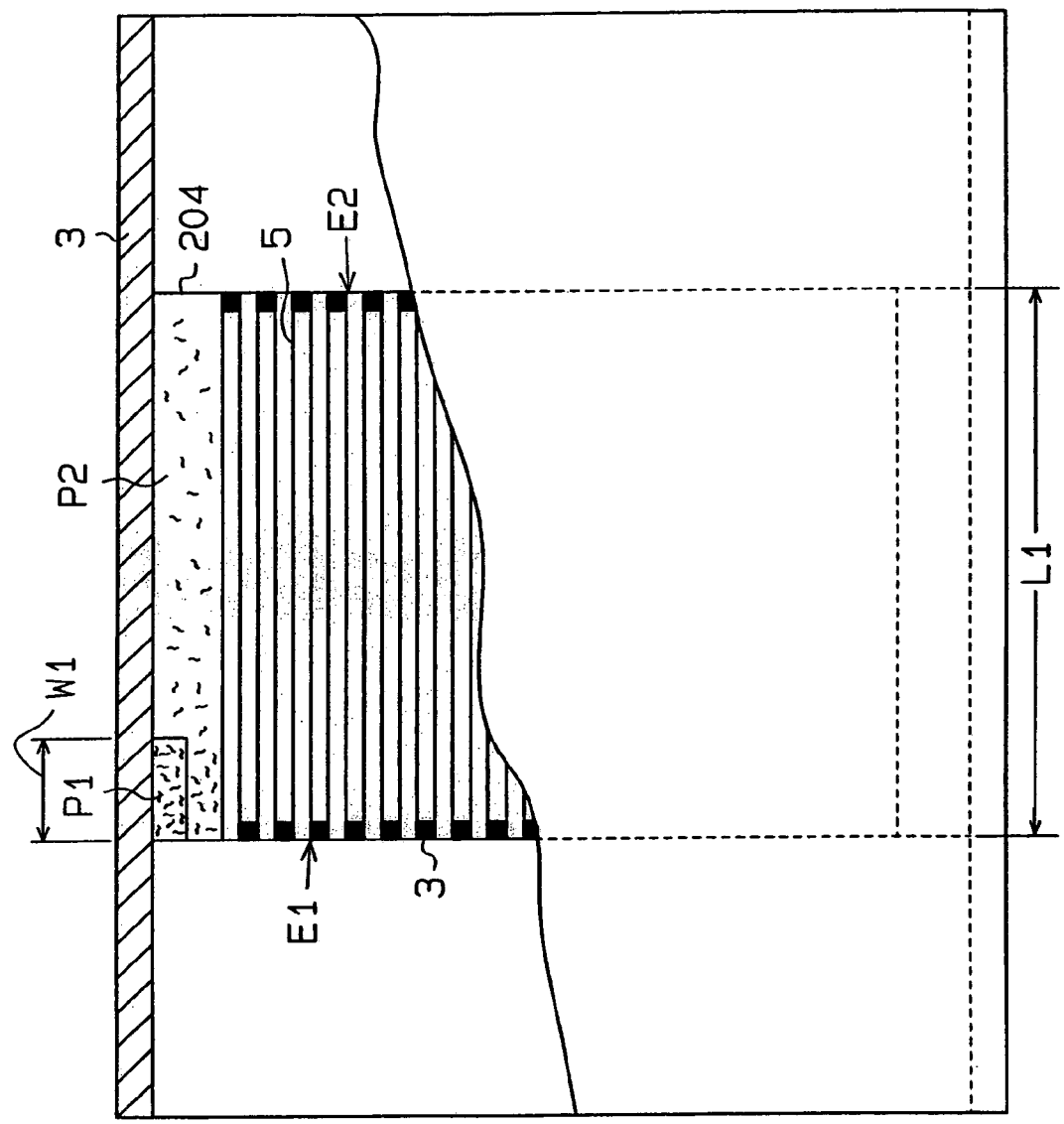

CATALYTIC CONVERTER AND METHOD FOR MANUFACTURING THE SAME

BACKGROUND OF THE INVENTION

1. Field of the Invention

The present invention relates to a catalytic converter, a method for manufacturing the same and a holding and sealing material for catalytic converters.

2. Discussion of the background

Internal combustion engines using gasoline and light oil as fuels have been used for a hundred years or longer as power sources for vehicles, particularly automobiles. However, harmful effects on the health and environment by exhaust gas produced in the internal combustion engine have become a matter of concern. Thus, various kinds of exhaust gas cleaning catalytic converters for removing CO, NOx and PM contained in exhaust gas have been proposed. The exhaust gas cleaning catalytic converter comprises a catalyst carrier, a metal shell covering the outer periphery of the catalyst carrier, and a holding and sealing material disposed in a gap between the catalyst carrier and the metal shell. A honeycomb-shaped cogierite carrier is used for the catalyst carrier, and a catalyst such as platinum is carried on the cogierite carrier.

Recently, studies have been conducted on a fuel cell that is a clean power source using no oil as a power source. In the fuel cell, electricity obtained when hydrogen reacts with oxygen to form water is used as a power source. Oxygen is obtained from air while hydrogen is obtained by reforming methanol or gasoline. Methanol is reformed into hydrogen by a catalyst reaction. In the fuel cell, a catalytic converter for fuel cells comprising the catalyst carrier, the metal shell covering the outer periphery of the catalyst carrier, and the holding and sealing material disposed in a gap between the catalyst carrier and the metal shell. The honeycomb-shaped cogierite carrier is used for the catalyst carrier, and a copper based catalyst is carried on the cogierite carrier.

The method for manufacturing the catalytic converter will be described.

First, a mat material 20 made of ceramic fibers is stamped out to prepare a holding and sealing material 21 having a shape shown in FIG. 20. A holding and sealing material 21 has a convex mating portion 22 formed at a first edge in the longitudinal direction, and a concave mating portion 23 formed at a second edge. The length of the holding and sealing material 21 is slightly shorter than the circumference of a catalyst carrier 24, and its width is almost equal to the thickness of the catalyst carrier 24.

Then, the holding and sealing material 21 is wound around the outer periphery 24a of the catalyst carrier 24. At this time, the both edges of the holding and sealing material 21 are fixed together at several points using an organic tape 25 such as vinyl (see FIG. 21). At this time, the convex mating portion 22 and the concave mating portion 23 engage with each other.

Then, the catalyst carrier 24 with the holding and sealing material 21 wound thereon is disposed in the metal shell bisected in advance, and the catalyst carrier 24 is clamped by the metal shell. In this way, the catalytic converter is completed. This production method is called a canning method. There are assembling methods such as a press fitting method and a clamping method in addition to the canning method.

However, for preparing the holding and sealing material 21 of FIG. 20, stamping using a stamping mold is required for forming convex and concave portions, resulting in poor workability. Also, the stamping of the mat material 20 involves a loss of material, resulting in increased production cost.

In addition, if the size and the sectional form of the catalyst carrier 24 are changed, the stamping form of the holding and sealing material 21 should be changed according to the change, resulting in poor versatility of the holding and sealing material 21. Necessity for a dedicated stamping mold is also responsible for the increased production cost.

In addition, if the density of the holding and sealing material 21 packed in the metal shell is low, the catalyst carrier 24 is easily worn and damaged, and gas is easily leaked from the seal portion. Thus, for solving these problems, the pack density should be increased by making the holding and sealing material 21 thicker as a whole. In this dase, however, the assembling of such as a press fitting and canning cannot easily be performed, thus making it difficult to manufacture the catalytic converter.

The exhaust gas supplied to the catalytic converter has a high temperature of several hundred degrees centigrade or greater, and also tends to generate pulse pressure. Therefore, the end of a gas inlet of the holding and sealing material, which is particularly susceptible to the influence of exhaust gas, is gradually wind-corroded and the holding and sealing material deteriorates. As a result, the carrier holding performance of the holding and sealing material is deteriorated in a relatively short time period, leading to the situation in which the catalyst carrier is easily worn and damaged, or gas is easily leaked from the seal portion. That is, with the conventional technique, the holding and sealing material does not have sufficient durability.

Furthermore, for a method of preventing wind corrosion to improve durability of the holding and sealing material, for example, a method has been proposed that uses a holding and sealing material produced by impregnating the mat material made of ceramic fibers in its entirety with an inorganic binder and sintering the mat material.

However, in the above described conventional technique involving impregnation and sintering, not only the cost for preparing the holding and sealing material is increased, but also deformability of the holding and sealing material is compromised, thus making it difficult to assemble.

BRIEF SUMMARY OF THE INVENTION

The first object of the present invention is to provide a catalytic converter that is inexpensive and capable of being produced easily.

The second object of the present invention is to provide a catalytic converter excellent in carrier holding performance and sealing performance and capable of being produced easily.

The third object of the present invention is to provide a catalytic converter excellent in durability.

In a first aspect of the present invention, a catalytic converter is provided that includes a catalyst carrier having an outer periphery, a metal shell covering the outer periphery of the catalyst carrier, and a holding and sealing material disposed between the catalyst carrier and the metal shell. The holding and sealing material is a beltlike holding and sealing material having a width equal to or smaller than one-half the length of the catalyst carrier, and is wound around the outer periphery of the catalyst carrier by one turn or more.

In a second aspect of the present invention, a catalytic converter is provided that includes a catalyst carrier having an outer periphery, a metal shell covering the outer periphery of the catalyst carrier, and a holding and sealing material disposed between the catalyst carrier and the metal shell. The holding and sealing material is a beltlike holding and sealing material having a width equal to or smaller than one-third the length of the catalyst carrier, and is wound around the outer periphery of the catalyst carrier by two turns or more.

In a third aspect of the present invention, a method for manufacturing the catalytic converter is provided. First, a beltlike holding and sealing material having a width equal to or smaller than one-half the length of a catalyst carrier is fixed such that the holding and sealing material is wound around the outer periphery of the catalyst carrier by one turn or more. Then, the catalyst carrier with the holding and sealing material wound thereon is disposed in a cylindrical metal shell.

In a fourth aspect of the present invention, a holding and sealing material for catalytic converters is provided that is disposed between a catalyst carrier having an outer periphery and a metal shell covering the outer periphery of the catalyst carrier. The holding and sealing material has a width equal to or smaller than one-half the length of the catalyst carrier, and has an adhesive layer provided in the surface of the holding and sealing material.

In a fifth aspect of the present invention, a catalytic converter is provided that includes a catalyst carrier having an outer periphery, a metal shell covering the outer periphery of the catalyst carrier, and a holding and sealing material disposed between the catalyst carrier and the metal shell. The holding and sealing material is wound around the outer periphery of the catalyst carrier such that one edge of the holding and sealing material is superimposed on another.

In a sixth aspect of the present invention, a catalytic converter is provided that includes a catalyst carrier having an outer periphery, a cylindrical metal shell covering the outer periphery of the catalyst carrier, and a holding and sealing material disposed between the catalyst carrier and the metal shell. The holding and sealing material includes a protrusion provided on the surface of the holding and sealing material and extending along the circumference of the catalyst carrier.

In a seventh aspect of the present invention, a method for manufacturing the catalyst carrier is provided. First, the holding and sealing material is fixed such that one edge of the holding and sealing material is superimposed on another. Then, the catalyst carrier with the holding and sealing material wound thereon is disposed in the metal shell.

In an eighth aspect of the present invention, a catalytic converter is provided that includes a catalyst carrier having an outer periphery, a cylindrical metal shell covering the outer periphery of the catalyst carrier, and a holding and sealing material disposed between the catalyst carrier and the metal shell. The holding and sealing material has a region provided at the end of the gas inlet in the holding and sealing material and having relatively high pack density.

In a ninth aspect of the present invention, a catalytic converter is provided that includes a catalyst carrier having an outer periphery, a cylindrical metal shell covering the outer periphery of the catalyst carrier, and a holding and sealing material disposed between the catalyst carrier and the metal shell. The holding and sealing material has a pair of regions provided at the end of the gas inlet and the end of the gas outlet in the holding and sealing material, respectively, and having relatively high pack density.

BRIEF DESCRIPTION OF THE DRAWINGS

FIG. 14 is a sectional view of the catalytic converter according to a ninth embodiment of the present invention;

DESCRIPTION OF PREFERRED EMBODIMENTS

First Embodiment

A catalytic converter 1 for automobile exhaust gas cleaning apparatus of a first embodiment of the present invention will be described below in accordance with FIGS. 1 to 3.

Figure 3:
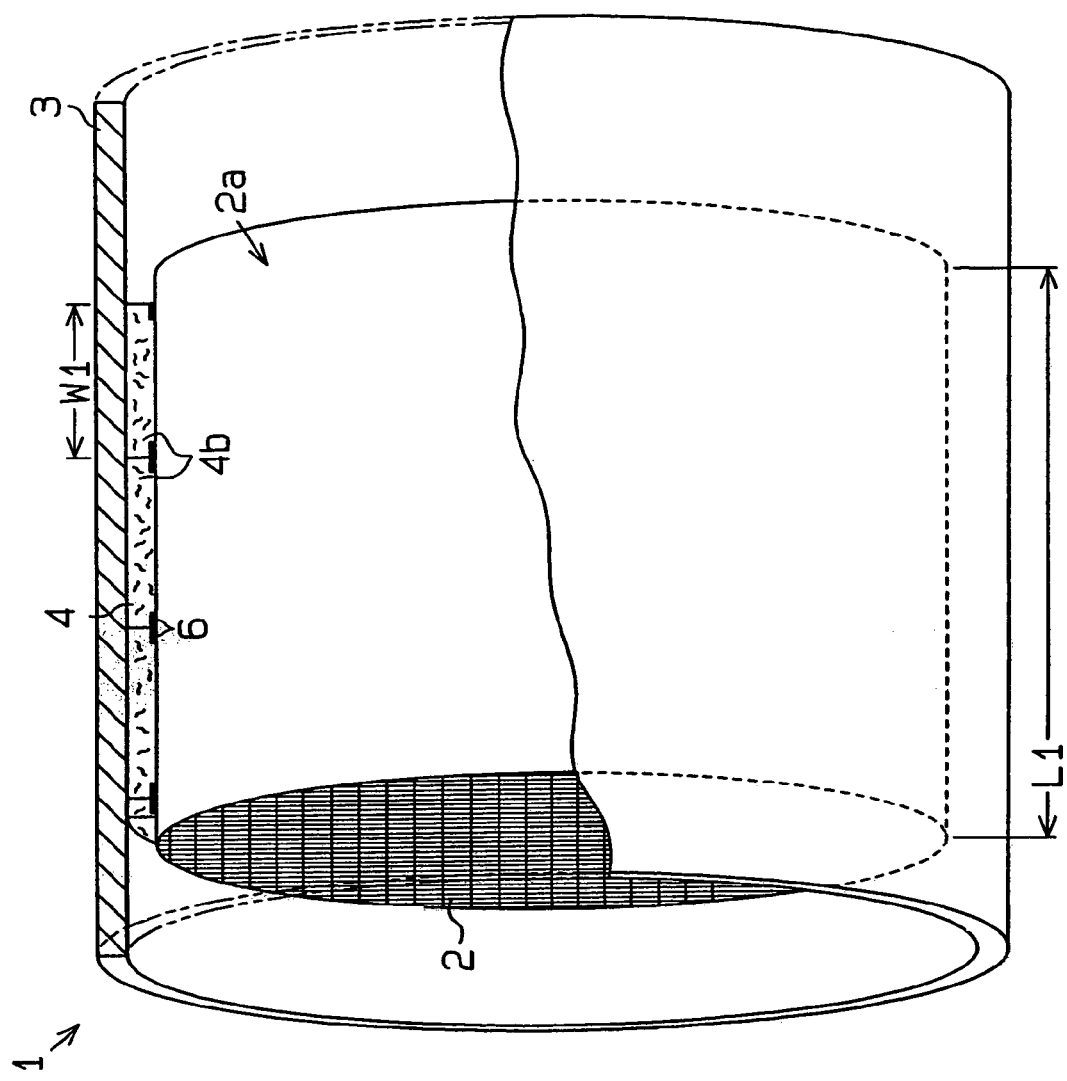
FIG. 3 is a partial sectional view of a catalytic converter according to the first embodiment of the present invention.

As shown in FIG. 3, the catalytic converter 1 of the first embodiment is provided at some midpoint along an exhaust pipe of an engine in an automobile body. The distance between the engine and the catalytic converter 1 is relatively small, and thus a high temperature exhaust gas of about 700° C. to 900° C. is supplied to the catalytic converter 1. If the engine is a lean-burn engine, a higher temperature exhaust gas of about 900° C. to 1000° C. is supplied to the catalytic converter 1.

The catalytic converter 1 includes a catalyst carrier 2, a metal shell 3 covering the outer periphery of the catalyst carrier 2, and a holding and sealing material 4 disposed in a gap between the catalyst carrier 2 and the metal shell 3.

The catalyst carrier 2 is prepared using a ceramic material represented by cogierite or the like. The catalyst carrier 2 is a cylindrical member having a circular section. The catalyst carrier 2 is preferably a honeycomb structure having a large number of cells 5 extending along the axis line. A precious metal based catalyst such as platinum or rhodium for cleaning exhaust gas components is carried on the cell wall. Furthermore, for example, a honeycomb porous sintered body such as silicon carbide and silicon nitride or the like may be used as the catalyst carrier 2.

If a press fitting method is employed for assembling of the catalytic converter 1, a cylindrical metal member having an O-shaped section is used as a metal shell 3. Furthermore, for the metal material for forming the cylindrical member, a metal having excellent heat resistance and impact resistance (e.g., a steel material such as stainless steel) is preferably selected. In the case where a canning method is employed instead of the press fitting method, a plurality of divided shells (i.e., clamshells) are used that are obtained by dividing along the axis line the cylindrical metal member having an O-shaped section If a rolling method is employed for assembly, for example, a cylindrical metal member having a C-shaped or U-shaped section (cylindrical metal member having a single slit (opening) extending along the axis line) is used. In this case, the catalyst carrier 2 with the holding and sealing material 4 fixed thereto is disposed in the metal shell 3, the metal shell 3 is rolled up in this state, and thereafter the opening end is sealed by welding, bonding, bolting or the like. The sealing such as welding, bonding and bolting is also performed in the case of the canning method.

The holding and sealing material 4 is formed in a mat form using heat resistant inorganic fibers as a main material. For the heat resistant inorganic fiber, for example, an alumina-silica based ceramic fiber is suitable. Instead thereof, for example, crystalline alumina fibers, silica fibers, rock wool, glass fibers or carbon fibers may be used. Furthermore, an organic binder may be contained as a sub-material in the holding and sealing material 4.

Figure 1:
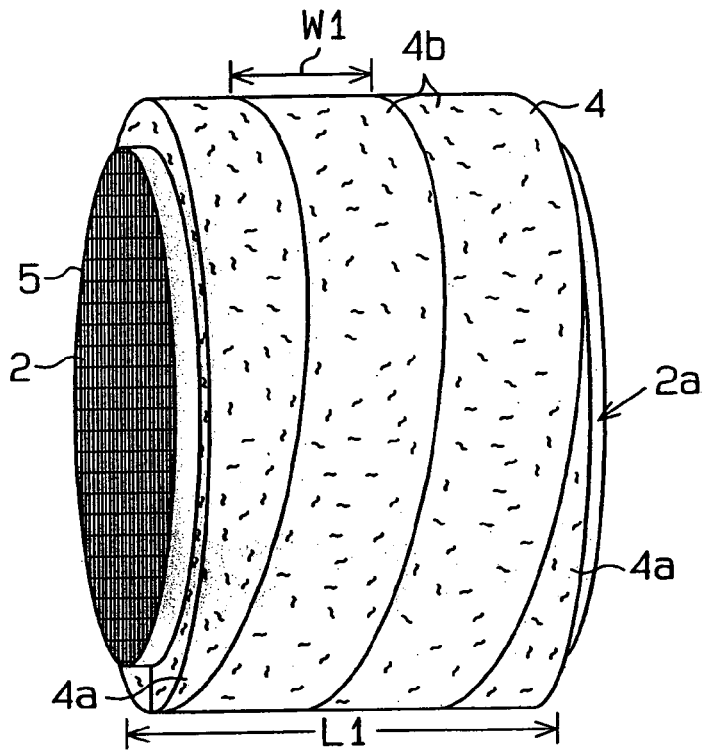
FIG. 1 is a perspective view of a catalyst carrier having a holding and sealing material in a catalytic converter according to a first embodiment of the present invention.
Figure 2:
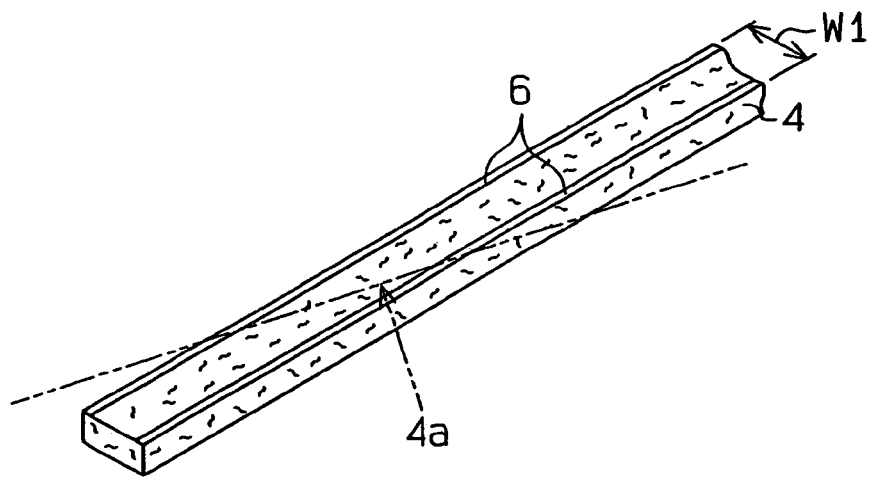
FIG. 2 is a partial perspective view of a holding and sealing material of FIG. 1.

As shown in FIG. 2, the holding and sealing material 4 has a long and narrow beltlike shape. Also, as shown in FIGS. 1 and 3, the holding and sealing material 4 is continuously and helically wound around the outer periphery 2a of the catalyst carrier 2.

The width W1 of the holding and sealing material 4 is constant except for both of its ends 4a. The width W1 of the holding and sealing material 4 is preferably equal to or smaller than one-half, more preferably one-third the length L1 along the axis line of the catalyst carrier 2, and is most preferably in the range of one-third to one tenth of the length L1.

The holding and sealing material 4 is longer than the circumference of the catalyst carrier 2. The length of the holding and sealing material 4 is preferably two times or more as long as the length of the circumference, more preferably three times or more as long as the length of the circumference. If the holding and sealing material 4 is longer than the circumference of the catalyst carrier 2, the holding and sealing material 4 can be wound around the outer periphery 2a of the catalyst carrier 2 by several turns.

As shown in FIG. 2, an adhesive layer 6 is formed on the holding and sealing material 4. For the adhesive layer 6, for example, an adhesive double coated tape is preferably used with both surfaces of the resin base coated with an adhesive. In this embodiment, a pair of adhesive layers 6 is formed at both edges on one face of the holding and sealing material 4. The adhesive double coated tape is provided along a longitudinal direction of the holding and sealing material 4 along both edges. The adhesive layer 6 may be provided covering one face of the holding and sealing material 4 in its entirety. However, the adhesive layer 6 is more advantageously provided on only part of one face of the holding and sealing material 4 for cost reduction. Furthermore, the holding and sealing material 4 is bonded to the outer periphery 2a of the catalyst carrier 2 by the adhesive layer 6.

As shown in FIG. 1, the widths of both ends 4a of the holding and sealing material 4 are smaller than the width of any part of the holding and sealing material 4 other than both of the ends 4a. Specifically, both ends 4a of the holding and sealing material 4 are formed by cutting the holding and sealing material 4 in a slanting direction with respect to the longitudinal direction and along a straight line, and tapering down towards the tip. That is, the holding and sealing material 4 has no mating portions formed at both ends, and thus has a very simple form with no irregularities.

The procedure for manufacturing the catalytic converter 1 will now be described.

First, the holding and sealing material 4 is prepared by a well known method to be long and narrow and uniform in width. In this case, the holding and sealing material 4 may be impregnated with an organic binder as required, and the holding and sealing material 4 may be compressed along its thickness. As the organic binder, polyvinyl alcohol and acryl resin may be used instead of latex such as acryl rubber, nitrile rubber and the like. As the impregnation method, well known methods such as an immersion method, a spray method and a roll coater method may be employed. Furthermore, the holding and sealing material 4, which is long and narrow and uniform in width, is stored in roll form until the winding is started.

In the winding step, the holding and sealing material 4 is drawn and cut into predetermined lengths. At this time, the holding and sealing material 4 is cut in a slanted direction so that the end 4a tapering towards the tip is formed as shown by the chain line in FIG. 2. Not only a mold but also other mean may be used for cutting the holding and sealing material 4.

Then, the holding and sealing material 4 is helically and continuously wound around the outer periphery 2a of the catalyst carrier 2. At this time, the holding and sealing material 4 is wound such that the adhesive layer 6 is opposed to the outer periphery 2a. As a result, the holding and sealing material 4 is fixed to the outer periphery 2a of the catalyst carrier 2 by the adhesive layer 6. Furthermore, both ends 4a of the wound holding and sealing material 4 are preferably fixed with organic tape. However, it is not absolutely necessary to fix the both ends with the organic tape.

Also, when the holding and sealing material 4 is wound, it is preferable that one edge 4b of the holding and sealing material 4 is not superimposed on the other. As shown in FIGS. 1 and 3, there is no gap between the adjacent edges 4b of the holding and sealing material 4 and the edges 4b are maintained in close contact with each other.

In the outer periphery 2a of the catalyst carrier 2, the area occupied by the wound portion of the holding and sealing material 4 (area covered with holding and sealing material 4) is preferably set to 50 to 100% of the total area of the outer periphery 2a.

The holding and sealing material 4 is preferably wound around at least the area between both ends of the outer periphery 2a. If the holding and sealing material 4 is not present in its area, a high temperature exhaust gas flows through the gap and propagates the heat from the gas into the metal shell 3. Therefore, the metal shell 3 tends to thermally deform, thus raising the possibility that the carrier holding performance degrades. In addition, the holding and sealing material 4 is easily wind-corroded and deteriorated, resulting in increased possibility that damaged fibers will be released outside.

After the holding and sealing material 4 is wound and fixed as described above, press fitting, canning or rolling is performed, whereby a desired catalytic converter 1 is completed. Furthermore, the bulk density (GBD) of the holding and sealing material 4 before assembly is preferably 0.05 g/cm$^3$ to 0.4 g/cm$^3$, further preferably 0.1 g/cm$^3$ to 0.2 g/cm$^3$. Also, the pack density of the assembled holding and sealing material 4 is preferably 0.1 g/cm$^3$ to 0.6 g/cm$^3$, further preferably 0.2 g/cm$^3$ to 0.4 g/cm$^3$. If the bulk density and the pack density are too low, it may be impossible to reliably hold the catalyst carrier 2 due to reduction in generated contact pressure. On the other hand, if the bulk density and the pack density are too high, assembly may be difficult, and fibers may be damaged and released to the exterior.

The thickness of the holding and sealing material 4 before assembly is set to preferably about 1.1 to 4.0 times, further preferably about 1.5 to 3.0 times as large as the size of the gap between the catalyst carrier 2 and the metal shell 3. If the thickness is less than 1.1 times as large as the size of the gap, a high level of holding performance cannot be obtained, and thus the catalyst carrier 2 may shift with respect to the metal shell 3 and be worn. Needless to say, in this case, a high level of sealing performance cannot be obtained, thus raising the possibility that the exhaust gas is leaked through the gap portion. In addition, if the thickness is larger than 4.0 times as large as the size of the gap, it becomes difficult to dispose the catalyst carrier 2 in the metal shell 3, particularly when the press fitting method is employed. Therefore, it may be impossible to achieve improvement in assembly performance.

Example will be described in detail below.

EXAMPLE

For the catalyst carrier 2, a cogierite monolith having an outer diameter of 130 mm and a length of 100 mm was used. For the metal shell 3, a cylindrical member made of SUS 304 with the thickness of 1.5 mm and the inner diameter of 140 mm and having an O-shaped section was used. For the holding and sealing material 4, a long size mat-like material made of alumina-silica based ceramic fibers impregnated with a 5 wt% resin binder (latex) was used. The thickness of the holding and sealing material 4 after being impregnated was 8 mm, and the bulk density thereof was 0.15 g/cm$^3$.

The width W1 of the holding and sealing material 4 was set to about 33 mm equivalent to about one-third the length L1 along the axis line of the catalyst carrier 2. The length of the holding and sealing material 4 was set to about 1300 mm equivalent to more than about three times as large as the circumference of the catalyst carrier 2. Also, the holding and sealing material 4 was wound by more than three turns (see FIG. 1).

Then, the catalyst carrier 2 with the holding and sealing material 4 wound and fixed thereon was press-fitted in the metal shell 3 to obtain the catalytic converter 1. Since the holding and sealing material 4 of the first embodiment had a simple form with no mating portions, it was not necessary perform stamping using a stamping mold during preparation of the holding and sealing material 4. Therefore, the catalytic converter 1 could be produced inexpensively and easily.

Then, the test was performed in which the catalytic converter 1 fabricated as described above was actually installed in a three liter gasoline engine and continuously operated. Thereafter, the catalytic converter 1 was taken apart and observed, and neither wind corrosion nor damage was found in either the catalyst carrier 2 or the holding and sealing material 4, and no trace of leakage of exhaust gas was found. In addition, no noise occurred during operation, and the catalyst carrier 2 was reliably held without being worn.

That is, the catalytic converter 1 was not only easy to assemble but also has excellent performance.

Thus, the catalytic converter 1 of the first embodiment can achieve the following effects.

(1) In the catalytic converter 1, the belt-like holding and sealing material 4 is wound around the outer periphery 2a of the catalyst carrier 2. Therefore, the holding and sealing material 4 having a simple form with no mating portions can be used. In addition, it is not necessary to perform stamping using a stamping mold during preparation of the holding and sealing material 4. As a result, the catalytic converter 1 can be manufactured inexpensively and easily.

In addition, since the holding and sealing material has a width equivalent to about one-third the length L1 along the axis line of the catalyst carrier 2, the holding and sealing material 4 can be wound around the outer periphery 2a of the catalyst carrier 2 by three turns or more such that one of adjacent edges 4b is not superimposed on the other. In addition, since the holding and sealing material 4 is wound by more than three turns, a high level of sealing performance is obtained.

(2) In the catalytic converter 1, the holding and sealing material 4 is helically and continuously wound around the outer periphery 2a. Therefore, the frequency in which the holding and sealing material 4 is prepared by cutting can be reduced compared with the case where the holding and sealing material 4 is wound on an intermittent basis, for example. In this way, workability of the winding can further be improved.

(3) Both ends 4a of the holding and sealing material 4 are tapered. Therefore, when the holding and sealing material 4 is helically and continuously wound, the holding and sealing material 4 is closely wound around the outer periphery at both ends of the catalyst carrier 2. Therefore, sealing performance can further be improved.

(4) In the holding and sealing material 4, one of adjacent edges 4b is not superimposed on the other. Therefore, an increase in the amount used of the holding and sealing material 4 is prevented, thus making it possible to achieve further cost reduction.

(5) The holding and sealing material 4 is bonded to the outer periphery 2a via the adhesive layer 6. Therefore, necessity to fix the holding and sealing material 4 to the outer periphery 2a using an inorganic tape is eliminated, and thus workability of winding is further improved compared with the conventional technique.

(6) Even if the size and the sectional form of the catalyst carrier 2 are changed, the change can be coped with reliably, and the desired catalytic converter 1 can be reliably produced. Thus, the holding and sealing material 4 has relatively high versatility.

Second Embodiment

Figure 4:
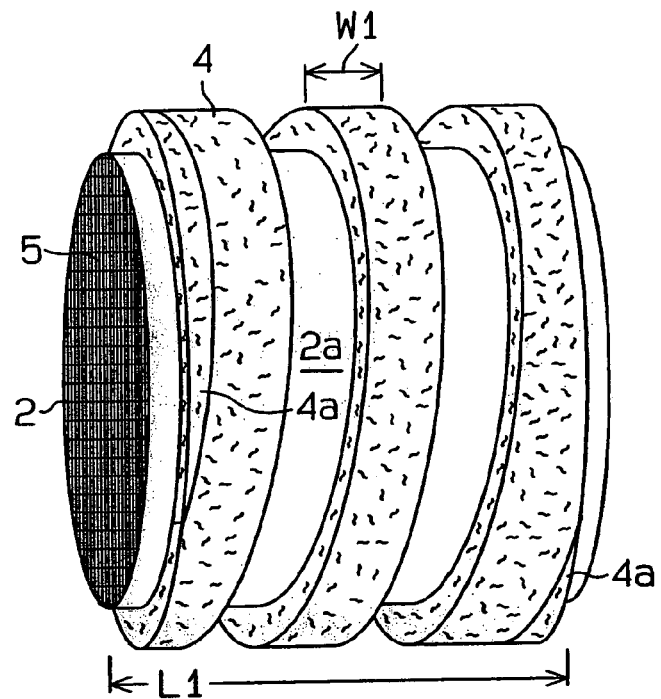
FIG. 4 is a perspective view of the catalyst carrier having the holding and sealing material according to a second embodiment of the present invention.

The catalytic converter of a second embodiment of the present invention will now be described based on FIG. 4. Here, elements different from those of the first embodiment are mainly described, and descriptions of common elements are omitted with the same reference numerals assigned.

In the second embodiment, the holding and sealing material 4 is helically and continuously wound in a state in which one of adjacent edges 4b is not superimposed on the other. In the second embodiment, a fixed space is maintained between the adjacent edges 4b unlike the first embodiment. In other words, the holding and sealing material 4 is wound in a state in which adjacent edges 4b are not maintained in close contact with each other.

Therefore, the amount used of the holding and sealing material 4 is reduced compared with the case where the holding and sealing material 4 is wound in a state in which adjacent edges 4b are maintained in close contact with each other. Therefore, according to the second embodiment, a further cost reduction can be achieved.

Third Embodiment

Figure 5:
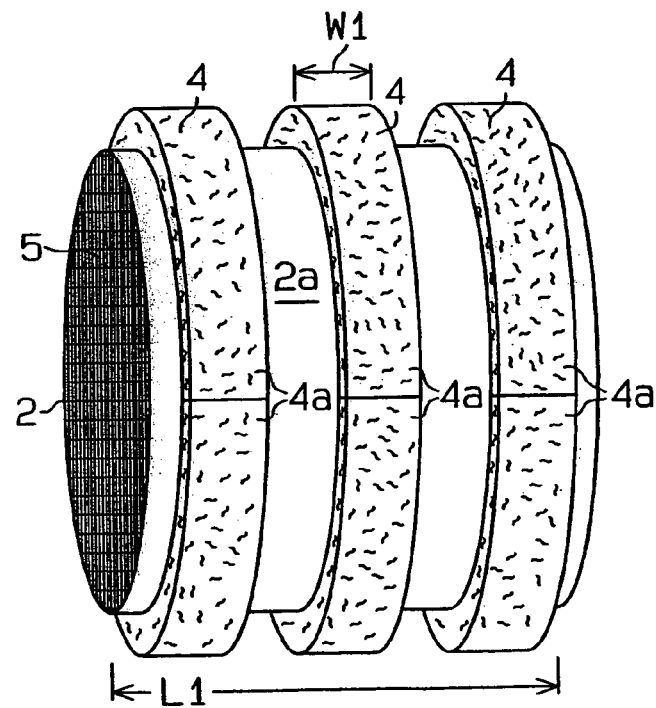
FIG. 5 is a perspective view of the catalyst carrier having the holding and sealing material according to a third embodiment of the present invention.

The catalytic converter of a third embodiment of the present invention will now be described based on FIG. 5. Here, elements different from those of the first embodiment are mainly described, and descriptions of common elements are omitted with the same reference numerals assigned.

In the third embodiment, three pieces of holding and sealing material 4 are used. The length of each piece of holding and sealing material 4 equals the circumference of the catalyst carrier 2. Therefore, the total length of the three pieces of holding and sealing material 4 is three times as large as the circumference. The three pieces of holding and sealing material 4 are wound around the outer periphery 2a of the catalyst carrier 2 with predetermined spacing maintained therebetween. That is, the three pieces of holding and sealing material 4 are wound discontinuously.

In addition, the end 4a of the holding and sealing material 4 is cut not in a slanted direction, but in a perpendicular direction with respect to the longitudinal direction of the holding and sealing material 4. That is, the holding and sealing material 4 is completely uniform in width. Therefore, in the third embodiment, the amount used of the holding and sealing material 4 is further reduced, and thus further cost reduction is achieved compared with the case where adjacent edges 4b are maintained in close contact with each other.

Fourth Embodiment

Figure 6:
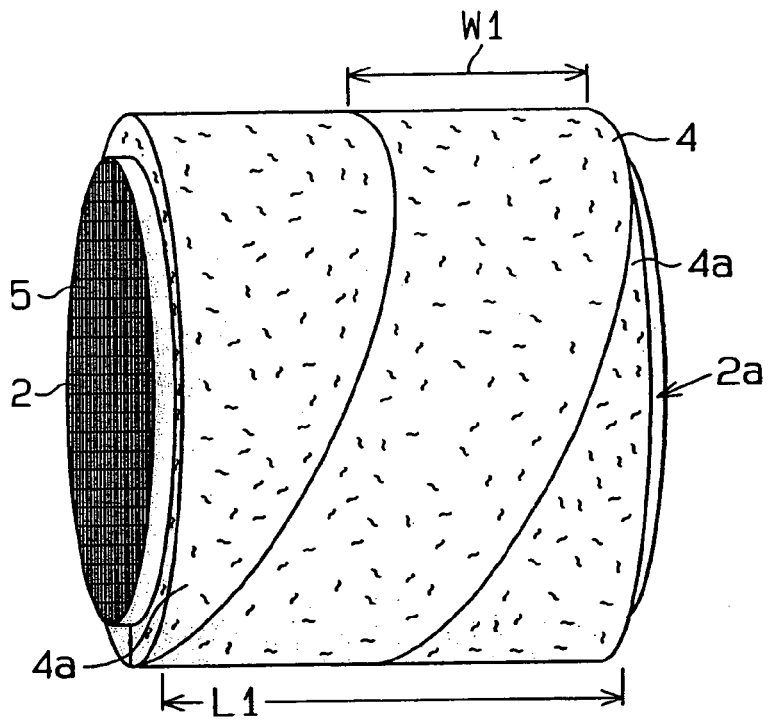
FIG. 6 is a perspective view of the catalyst carrier having the holding and sealing material according to a fourth embodiment of the present invention.

The catalytic converter of a fourth embodiment of the present invention will now be described based on FIG. 6. Here, elements different from those of the first embodiment are mainly described, and descriptions of common elements are omitted with the same reference numerals assigned.

In the fourth embodiment, the width W1 of the holding and sealing material 4 is larger than the width of the holding and sealing material 4 of the first embodiment. Here, the width W1 of the holding and sealing material 4 is about one-half the length L1 along the axis line of the catalyst carrier 2. In addition, the length of the holding and sealing material 4 is more than two times as large as the circumference of the catalyst carrier 2. Therefore, according to the fourth embodiment, the number of turns by which the holding and sealing material 4 is wound around the outer periphery 2a can be reduced to two turns.

Fifth Embodiment

Figure 7:
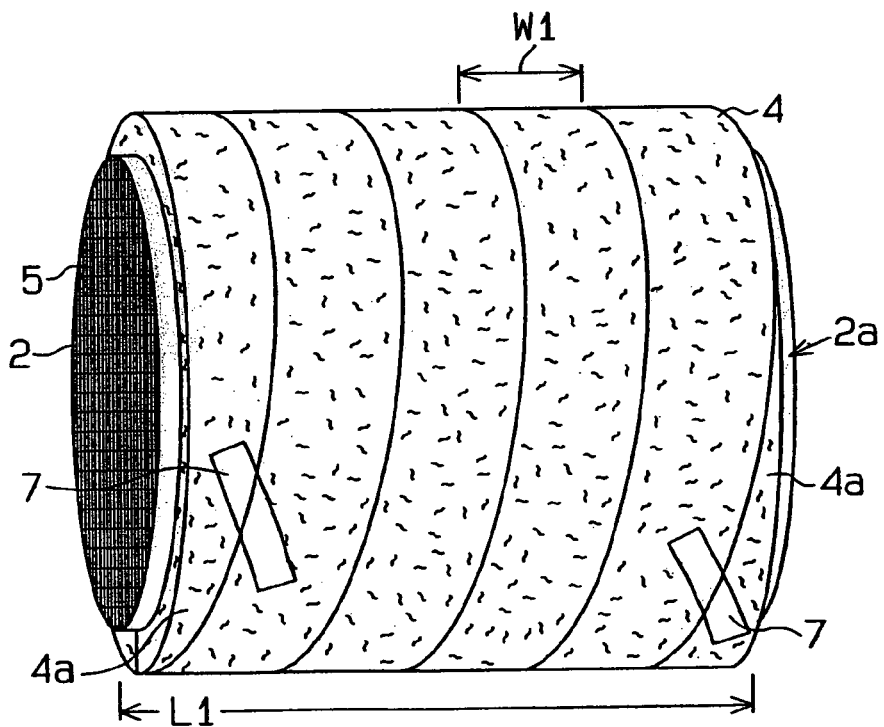
FIG. 7 is a perspective view of the catalyst carrier having the holding and sealing material according to a fifth embodiment of the present invention.

The catalytic converter of a fifth embodiment of the present invention will now be described based on FIG. 7. Here, elements different from those of the first embodiment are mainly described, and descriptions of common elements are omitted with the same reference numerals assigned.

In the fifth embodiment, the holding and sealing material 4 does not have the adhesive layer 6 made of adhesive double coated tape. Instead, an organic tape 7 is bonded to both ends 4a of the holding and sealing material 4 after winding is performed. As a result, the holding and sealing material 4 is fixed on the outer periphery 2a. Therefore, according to the fifth embodiment, necessity to bond the organic tape 7 reduces the workability of winding, while the configuration of the holding and sealing material 4 is simplified due to the omission of the adhesive layer 6. Therefore, the cost for the holding and sealing material 4 is further reduced.

Sixth Embodiment

A catalytic converter 101 for an automobile exhaust gas cleaning apparatus of a sixth embodiment of the present invention will be described in detail below based on FIGS. 8 to 10. Detailed descriptions of elements identical to those of the first embodiment are omitted with the same reference numerals assigned.

Figure 8:
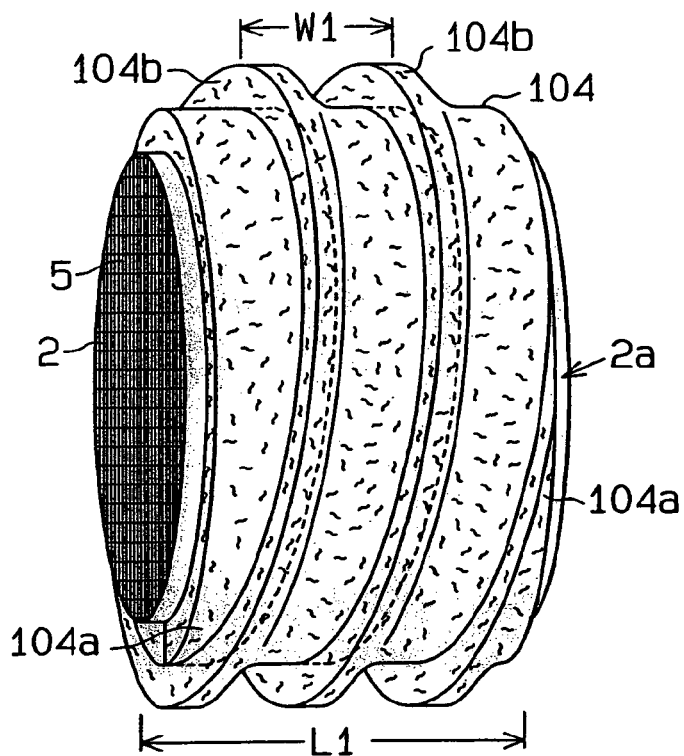
FIG. 8 is a perspective view of the catalyst carrier having the holding and sealing material in the catalytic converter according to a sixth embodiment of the present invention.
Figure 9:
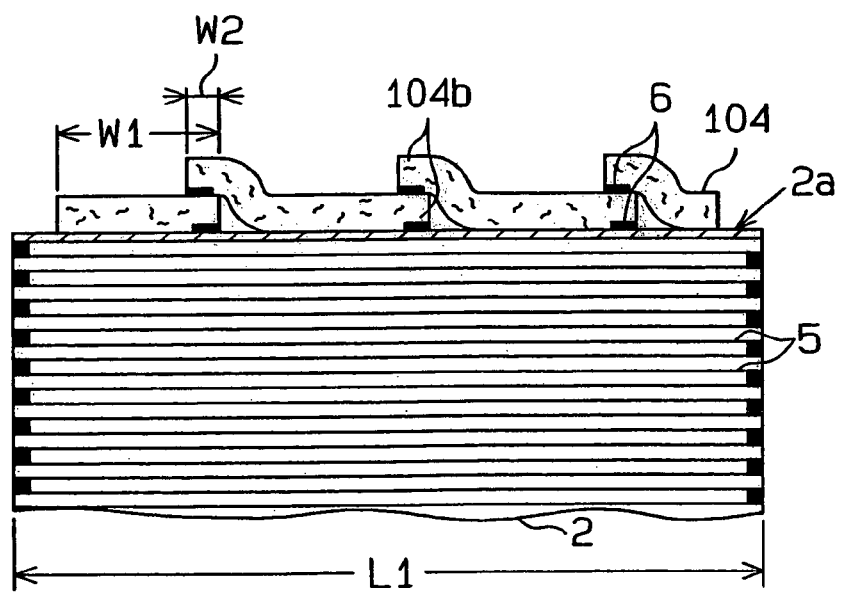
FIG. 9 is an enlarged view of part of the catalyst carrier having the holding and sealing material in FIG. 8.
Figure 10:
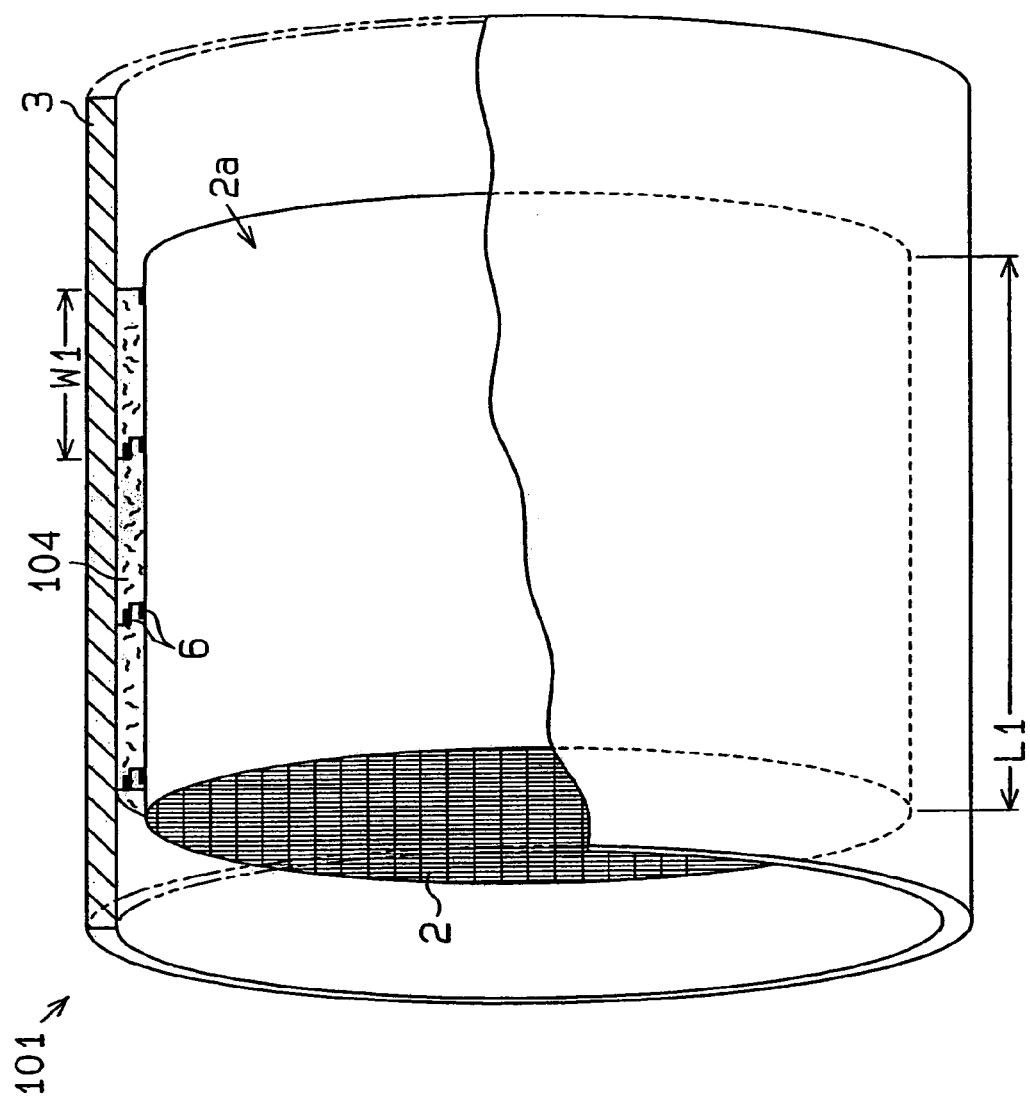
FIG. 10 is a partial sectional view of the catalytic converter according to a sixth embodiment of the present invention.

As shown in FIGS. 8 and 9, a holding and sealing material 104 of the sixth embodiment is wound around the outer periphery 2a of the catalyst carrier 2 with one of the adjacent edges 104b of the holding and sealing material 104 superimposed on the other.

The superimposed area of the holding and sealing material 104 has a length equivalent to at least one turn around the circumference, preferably two or more turns of the circumference of the catalyst carrier. This is because an area of high pack density having a ring-like shape is formed during assembly, thus bringing about a situation in which so a called O-ring structure is disposed on the outer surface of the holding and sealing material 104. In this way, sealing performance is further improved.

The width W2 of the superimposed area in the holding and sealing material 104 is preferably smaller than the width W1 of the holding and sealing material 104, and specifically it is preferably about 5 mm to 15 mm.

If the width W2 of the superimposed area is less than 5 mm, the width of the area of high pack density may be too small to satisfactorily improve carrier holding performance and sealing performance. Conversely, if the width W2 of the superimposed area exceeds 15 mm, the proportion of the thick area in the holding and sealing material 104 is increased and as a result, it may be difficult to assemble. In addition, the amount used of the holding and sealing material 104 is increased, resulting in a rise in cost.

The area occupied by the superimposed area in the holding and sealing material 104 is equivalent to preferably one-third or less, more preferably one fourth or less, most preferably one fifth or less of the area of the non-superimposed area.

If the ratio of the superimposed area to the non-superimposed area exceeds 1/3, the proportion of the thick area in the holding and sealing material 104 is increased and as a result, it may be difficult to assemble. In addition, the amount used of the holding and sealing material 104 is increased, resulting in a rise in cost.

The procedure for manufacturing the catalytic converter 101 will now be described.

The holding and sealing material 104, cut in the same manner as the first embodiment, is helically and continuously wound around the outer periphery 2a of the catalyst carrier 2. At this time, the holding and sealing material 104 is wound around the outer periphery 2a such that the adhesive layer 6 faces the outer periphery 2a, and one of the edges 104b of the holding and sealing material 104 is superimposed on the other. As a result, the holding and sealing material 104 is fixed to the outer periphery 2a of the catalyst carrier 2 and the adjacent edge 104b by the adhesive layer 6. In addition, a protrusion (i.e. superimposed area) extending along the circumference of the catalyst carrier 2 is formed on the outer surface of the wound holding and sealing material 104.

Before the holding and sealing material 104 is disposed in the gap, the height of the protrusion is preferably 1.1 to 2.0 times, more preferably 1.5 to 2.0 times as large as the thickness of the holding and sealing material 104.

If the ratio of the thickness to the height is less than 1.1, the degree of compression of the protrusion is too small to sufficiently increase the pack density in the protrusion area. Thus, carrier holding performance and sealing performance cannot be satisfactorily improved. Conversely, if the ratio of the thickness to the height is larger than 2.0, the degree of compression of the protrusion may be too large to assemble easily.

Before the holding and sealing material 104 is disposed in the gap, the thickness of the holding and sealing material 104 (thickness of non-superimposed area) is preferably about 1.1 to 4.0 times, more preferably 1.5 to 3.0 times as large as the size of the gap between the catalyst carrier 2 and the metal shell 3.

In addition, the area occupied by the holding and sealing material 104 (area covered by holding and sealing material 104) in the outer periphery 2a of the catalyst carrier 2 is preferably equal to 80 to 100% of the total area of the outer periphery 2a.

In a state in which the holding and sealing material 104 is disposed in the gap, the pack density of the protrusion area is preferably 0.1 g/cm$^3$ to 0.6 g/cm$^3$, more preferably 0.2 g/cm$^3$ to 0.4 g/cm$^3$. The bulk density and the pack density are too low, it may be impossible to reliably hold the catalyst carrier 2 due to reduction in generated contact pressure. On the other hand, if the bulk density and the pack density are too high, assembly may be difficult, and fibers in the protrusion area may be damaged and released to the exterior.

An example will be described in detail below.

EXAMPLE

The catalyst carrier 2 and the metal shell 3 the same as the first embodiment was used. The width W1 of the holding and sealing material 104 was set to 35 mm equivalent to more than one-third the length along the axis line L1 of the catalyst carrier 2. In addition, the holding and sealing material 104 was wound by more than three turns (see FIG. 8).

The superimposed area in the holding and sealing material 104, helically and continuously wound around the outer periphery 2a, had a length equivalent to two or more turns of the circumference of the catalyst carrier 2. Also, the width W2 of the superimposed area was set to about 7 mm. The height of the protrusion was 2.0 times as large as the thickness of the holding and sealing material 104 before being disposed in the gap.

Then, the catalyst carrier 2 with the holding and sealing material 104 wound and fixed thereon was press-fitted in the metal shell 3 to obtain the catalytic converter 101. In this assembly state, the protrusion area was compressed along the thickness, and the pack density of the holding and sealing material 104 in the area was particularly high. That is, the pack density of the protrusion area with the holding and sealing material 104 disposed in the gap was about 0.3 g/cm$^3$, and the pack density of the area other than the protrusion area was about 0.15 g/cm$^3$.

Furthermore, the thickness of the holding and sealing material 104 of the sixth embodiment was not generally so large, and therefore assembly was not so difficult. In addition, since the holding and sealing material 104 had a simple form with no mating portions, it was not necessary to perform stamping using a stamping mold during preparation of the holding and sealing material 104. Therefore, the catalytic converter 101 could be produced inexpensively and easily.

Then, the test was performed in which the catalytic converter 101 fabricated as described above was actually installed in a three liter gasoline engine and continuously operated. Thereafter, the catalytic converter 101 was taken apart and observed, and neither wind corrosion nor damage was found in either the catalyst carrier 2 or the holding and sealing material 104, and no trace of leakage of exhaust gas was found. In addition, no noise occurred during operation, and the catalyst carrier 2 was reliably held without being worn.

That is, this catalytic converter 101 could be produced inexpensively and easily and was had excellent performance.

Thus, the following effects can be obtained according to the sixth embodiment.

(1) When the catalyst carrier 2 is assembled, the protrusion area is compressed along its thickness, and therefore the pack density of the holding and sealing material 104 is increased particularly for that area. In this way, the carrier holding performance is enhanced by providing the protrusion area, and thus the catalyst carrier 2 is not likely to be worn. Also, since the area of high pack density extends along the circumference of the catalyst carrier 2, the exhaust gas hardly passes through, and thus sealing performance is improved. In addition, the thickness of the holding and sealing material 104 is not generally so large, and therefore assembly is not so difficult, thus making it possible to easily produce the catalytic converter 101.

(2) In the catalytic converter 101, an area of high pack density having a ring-like shape during assembly, thus bringing about a situation in which a so called O-ring structure is disposed on the outer surface of the holding and sealing material 104, and as a result, sealing performance is further improved.

(3) In the catalytic converter 101, the holding and sealing material 104 is helically and continuously wound. Therefore, the number of fixation sites can be reduced and winding is easier compared with the case where the holding and sealing material 104 is wound on an intermittent basis. Also, it is advantageous in terms of reduced cost.

(4) In the catalytic converter 101, the width W2 of the superimposed area is set to a level in a suitable range, and therefore it can be easily produced and an increase in cost can be prevented while satisfactorily achieving an improvement in carrier holding performance and sealing performance. Also, the area ratio between the assembled area and the non-assembled area is set to a level in a suitable range, and therefore the catalytic converter 101 can easily be produced and an increase in cost can be prevented.

(5) The holding and sealing material 104 includes the adhesive layer 6, thus making it possible to fix the holding and sealing material 104 to the outer periphery 2a without necessity for using tape. Therefore, winding is easier. In addition, if there is an adhesive layer 6 at least on both edges, the edges 104b can reliably be bonded together (i.e., a protrusion area can be formed), and thus a gap is hardly created between adjacent edges 104b.

(6) The beltlike holding and sealing material 104 can reliably cope with the change of the size and sectional form of the catalyst carrier 2, and the desired catalytic converter 101 can be reliably produced. Thus, the holding and sealing material 104 has relatively high versatility.

(7) The holding and sealing material 104 is wound around the outer periphery 2a of the catalyst carrier 2 such that one of the edges 104b of the holding and sealing material 104 is superimposed on the other. Thus, in spite of relatively simple work, a protrusion having a suitable shape can be formed on the outer surface of the holding and sealing material 104. Therefore, the desired catalytic converter 101 can be easily and reliably obtained.

Seventh Embodiment

Figure 11:
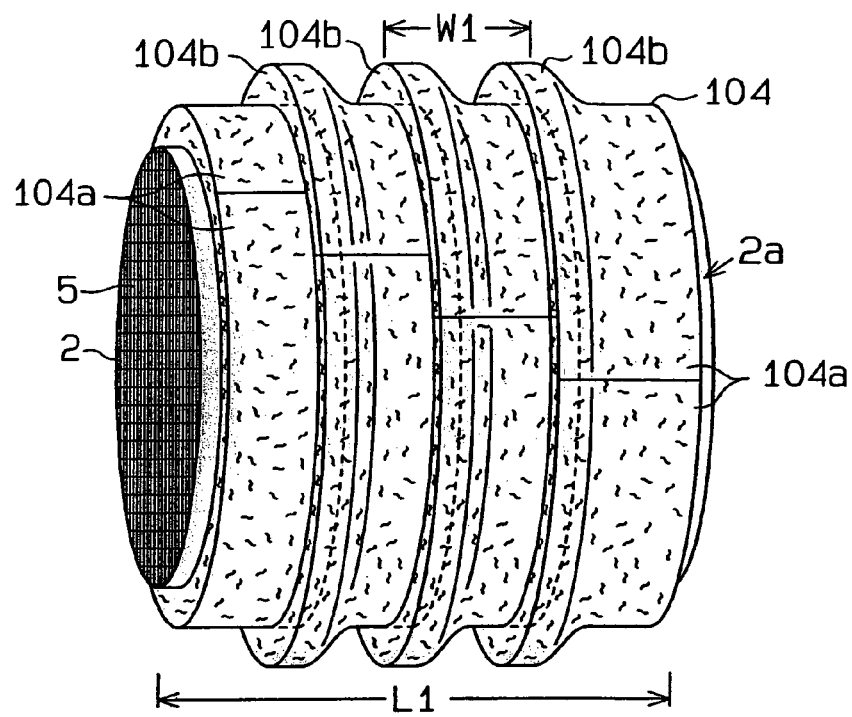
FIG. 11 is a perspective view of the catalyst carrier having the holding and sealing material according to a seventh embodiment of the present invention.

A seventh embodiment of the present invention will now be described based on FIG. 11. Here, elements different from those of the sixth embodiment are mainly described, and descriptions of common elements are omitted with the same reference numerals assigned.

In the seventh embodiment, four pieces of holding and sealing material 104 are used. The length of each piece of holding and sealing material 104 equals the circumference of the catalyst carrier 2. Therefore, the total length of the four pieces of holding and sealing material 104 is four times as large as the circumference. These pieces of holding and sealing material 104 are wound around the outer periphery 2a of the catalyst carrier 2 one after another, namely discontinuously. Furthermore, one of the edges 104b of the holding and sealing material 104 is partially superimposed on the other as in the case of the sixth embodiment.

The end 104a of the holding and sealing material 104 is cut perpendicular with respect to the longitudinal direction of the holding and sealing material 104. That is, the holding and sealing material 104 is completely uniform in width.

Figure 12:
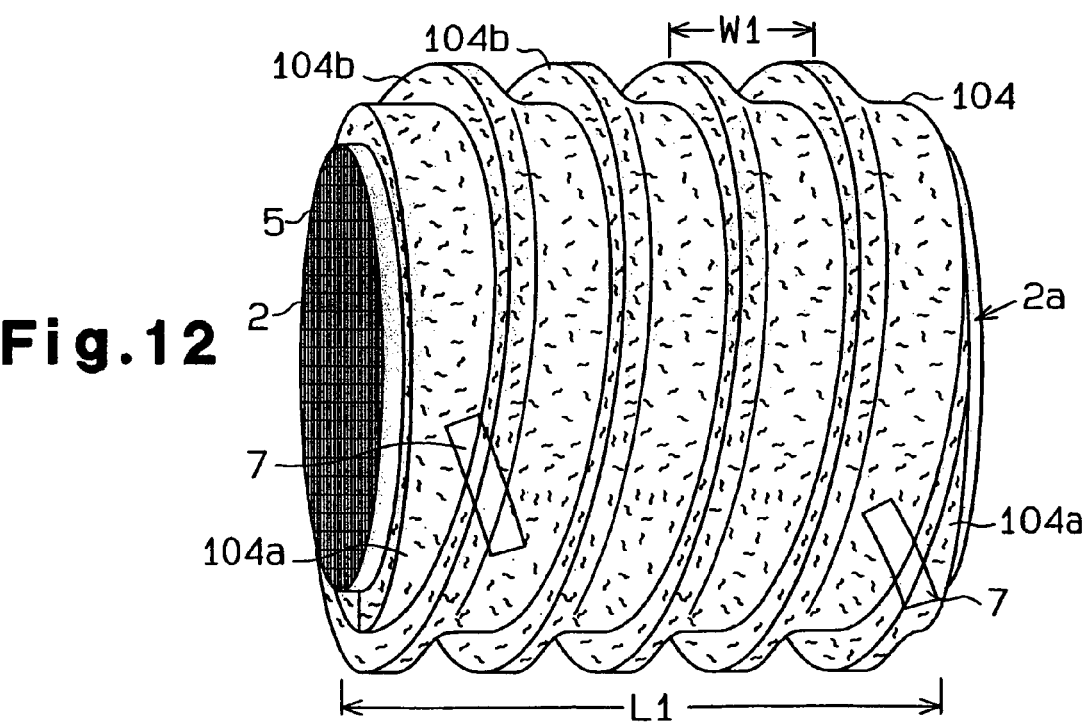
FIG. 12 is a perspective view of the catalyst carrier having the holding and sealing material according to an eighth embodiment of the present invention.

Therefore, in the configuration of the seventh embodiment, a catalytic converter 101 can be obtained having excellent carrier holding performance and sealing performance and capable of being produced easily Eighth Embodiment The catalytic converter 101 of an eighth embodiment of the present invention will now be described based on FIG. 12. Here, elements different from those of the sixth embodiment are mainly described, and descriptions of common elements are omitted with same numerals assigned.

In the eighth embodiment, the holding and sealing material 104 which does not have the adhesive layer 6 is used. Instead, the organic tape 7 is bonded to the both ends 104a of the holding and sealing material 104 after winding is performed. As a result, the holding and sealing material 104 is fixed on the outer periphery 2a. Thus, in the eighth embodiment, the catalytic converter 101 excellent in carrier holding performance and sealing performance and capable of being produced easily can be obtained.

In addition, the configuration of the holding and sealing material 104 can be simplified due to absence of the adhesive layer 6. Therefore, the cost of the holding and sealing material 104 is reduced.

Furthermore, the first to eighth embodiments may be changed as follows.

The holding and sealing material 4 may be wound around the outer periphery 2a helically and continuously.

The adhesive layer 6 in the holding and sealing material 4 is not limited to the double-coated adhesive tape. For example, the adhesive layer may be formed by coating the surface of the holding and sealing material 4 with an adhesive and drying the same. Furthermore, the adhesive layer 6 may be applied to the holding and sealing material 4 or the outer periphery 2a of the catalyst carrier 2 when the holding and sealing material 4 is wound.

Ninth Embodiment

Figure 13A:
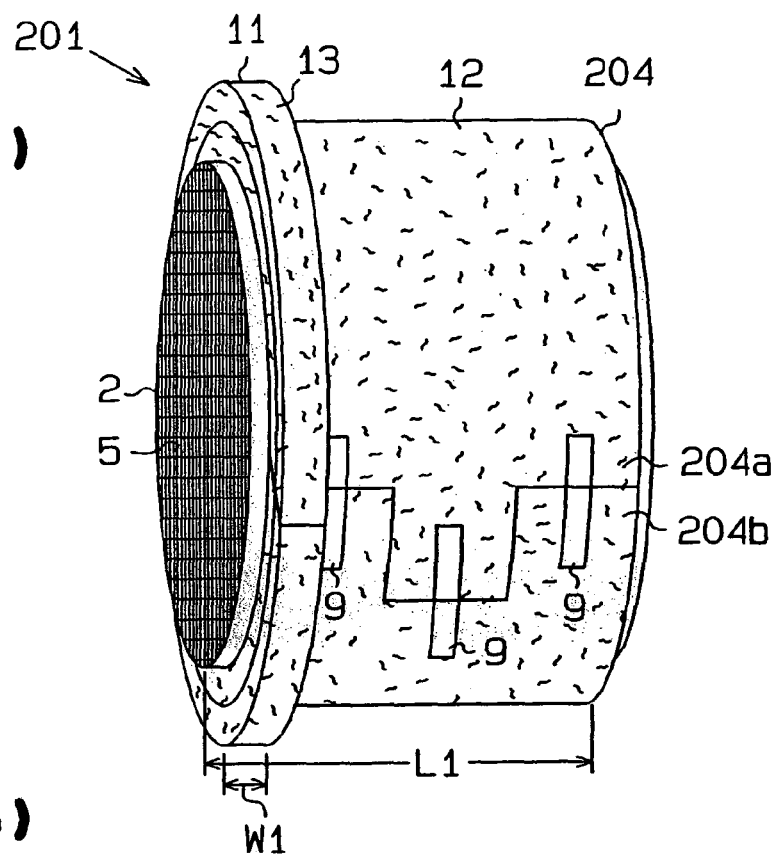
FIG. 13(a) is a perspective view of the catalyst carrier having the holding and sealing material in the catalytic converter according to a ninth embodiment of the present invention.

A catalytic converter 201 for an automobile exhaust gas cleaning apparatus according to a ninth embodiment of the present invention will be described in detail below based on FIGS. 13(a), 13(b) and 14. Detailed descriptions of elements the same as those of the first embodiment are omitted with the same reference numerals assigned.

As shown in FIG. 14, the catalytic converter 201 of the ninth embodiment includes a holding and sealing material 204 disposed in a gap between the catalyst carrier 2 and the metal shell 3. Furthermore, in FIG. 14, the left end of the catalyst carrier 2 is a gas inlet end E1, and the right end is a gas outlet end E2.

Figure 13B:
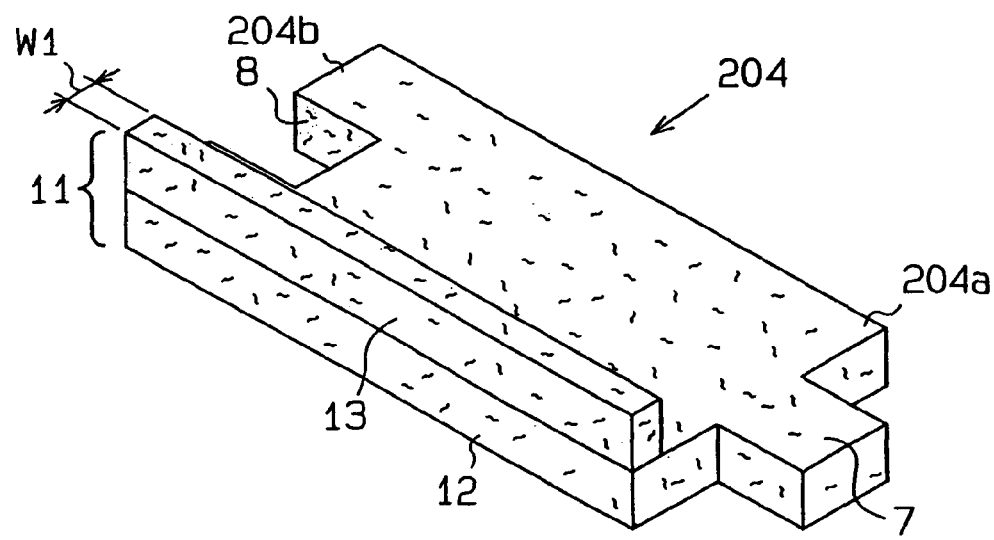
FIG. 13(b) is a perspective view of the holding and sealing material.

As shown in FIG. 13(b), the holding and sealing material 204 is a long size matt-like material. A convex mating portion 207 is formed at one end 204a (i.e., mating end) of the holding and sealing material 204, and a concave mating portion 208 is formed at the other end 204b (i.e., mating end). As shown in FIGS. 13(a) and 14, the holding and sealing material 204 is wound around the outer periphery 2a of the catalyst carrier 2, and mating ends 204a and 204b are fixed by an organic tape 9. The convex mating portion 207 and the concave mating portion 208 are engaged with each other when the holding and sealing material 204 is wound, and the engagement portion is fixed by the organic tape 9.

In FIG. 13(b), a thick region 11 is provided at one edge in one face of the holding and sealing material 204. The thick region 11 is compressed to form a high pack density region P1 after the holding and sealing material 204 is assembled. Specifically, the thick region 11 is formed by attaching a sub-holding and sealing material 13 on the main holding and sealing material 12. Furthermore, the width of the sub-holding and sealing material 13 is smaller than the width of the main holding and sealing material 12.

The W1 of the high pack density region P1 in the holding and sealing material 204 is preferably one twentieth to one fifth, more preferably one fifteenth to one seventh the length L1 of the catalyst carrier 2. If the width W1 is less than one twentieth the length L1, a length required for delaying the progress of wind corrosion is not secured, thus raising the possibility that durability cannot be sufficiently improved. Conversely, if the width W1 exceeds one fifth the length L1, assembly may be difficult.

The width W1 of the high pack density region P1 in the holding and sealing material 204 is preferably 5 to 30 mm, more preferably 10 to 20 mm. If the width W1 is less than 5 mm, the length required for delaying the progress of wind corrosion is not secured, thus raising the possibility that durability cannot be sufficiently improved. Conversely, if the width W1 exceeds 30 mm, assembly may be difficult.

The thickness of the thick region 11 in the holding and sealing material 204 before assembly is preferably 1.1 to 3.0 times, more preferably 1.5 to 2.5 times as large as the thickness of the main holding and sealing material 12. If the thickness is less than 1.1 times as large as the thickness of the main holding and sealing material 12, the difference in density between the high pack density region P1 and the low pack density region P2 is reduced. Conversely, if the thickness is more than 4.0 times as large as the thickness of the main holding and sealing material 12, assembly may be difficult.

Furthermore, the thickness of the holding and sealing material 204 (thickness of main holding and sealing material 12) before assembly is preferably about 1.1 to 4.0 times, more preferably about 1.5 to 3.0 times as large as the size of the gap between the catalyst carrier 2 and the metal shell 3. If the thickness is less than 1.1 times as large as the size of the gap, it may be impossible to obtain suitable carrier holding performance and sealing performance for the gap portion as a whole. Also, if the thickness is more than 4.0 times as large as the size of the gap, it may be impossible to achieve an improvement in assembling performance.

In a state in which the holding and sealing material 204 is assembled, the pack density of the low pack density region P2 is preferably 0.20 g/cm$^3$ to 0.35 g/cm$^3$, and the pack density of the high pack density region P1 is 0.35 g/cm$^3$ to 0.50 g/cm$^3$.

If the pack density of the low pack density region P2 is lower than 0.20 g/cm$^3$, it may be impossible to obtain satisfactory carrier holding performance and sealing performance for the gap portion as a whole even if the high pack density region P1 is provided. If the pack density of the low pack density region P2 is higher than 0.35 g/cm$^3$, or the pack density of the high pack density region P1 is lower than 0.35 g/cm$^3$, a difference in density between both regions is reduced. Also, if the pack density of the high pack density region P1 is higher than 0.50 g/cm$^3$, assembly may be difficult to carry out. Also, even if assembly can be performed, rupture of the catalyst carrier 2 may be caused.

The procedure for manufacturing the catalytic converter 201 will now be described.

First, a mat-like material of predetermined thickness as a material for the holding and sealing material 204 is prepared by a well known method. Then, the mat-like material is stamped into predetermined shapes using a forming mold, thereby obtaining the main holding and sealing material 12 and the sub-holding and sealing material 13 from one mat-like material, respectively. Furthermore, the main holding and sealing material 12 and the sub-holding and sealing material 13 may be obtained separately from mat-like materials having different thicknesses and materials.

Then, the sub-holding and sealing material 13 is attached on the main holding and sealing material 12 to prepare the holding and sealing material 204 having the thick region 11. Furthermore, the method for attaching the sub-holding and sealing material 13 on the main holding and sealing material 12 includes, for example, bonding and stitching.

Then, the holding and sealing material 204 is wound around the outer periphery 2a of the catalyst carrier 2, and the mating ends 204a and 204b are fixed by the organic tape 9 to fix the holding and sealing material 204 to the catalyst carrier 2. Furthermore, means other than the organic tape 9 may be used to fix the holding and sealing material 204. Thereafter, press fitting, canning or rolling is performed to complete the desired catalytic converter 201.

An example will be described in detail below.

EXAMPLE

A cogierite monolith having an outer diameter of 130 mmφ and a length of 100 mm was used. A cylindrical member made of SUS 304 with a thickness of 1.5 mm and an inner diameter of 140 mm and having an O-shaped section was used as the metal shell 3. For the holding and sealing material 204, a long-sized mat-like material (thickness of 8 mm) made of alumina-silica based ceramic fibers was used. The main holding and sealing material 12 and the sub-holding and sealing material 13 were obtained from the mat-like material, and the main holding and sealing material 12 were bonded to the sub-holding and sealing material 13 using an adhesive, whereby the holding and sealing material 204 having the thick region 11 was prepared.

The width of the main holding and sealing material 12 was set to 100 mm, and the width of the sub-holding and sealing material 13 was set to 10 mm. Therefore, the width W1 of the thick region 11 constituting the high pack density region P1 was 10 mm and the thickness thereof was 16 mm.

The holding and sealing material 204 was wound and fixed on the catalyst carrier 2 by the organic tape 9, and the catalyst carrier 2 was press fitted in the metal shell 3 to obtain the catalytic converter 201. Furthermore, the catalytic converter 201 could be assembled relatively easily without any difficulty. In an assembled state, the pack density of the low pack density region P2 was 0.20 g/cm$^3$, and the pack density of the high pack density region P1 was 0.40 g/cm$^3$.

Then, the test was performed in which the catalytic converter 201 was actually installed in a three liter gasoline engine and continuously operated. Thereafter, the catalytic converter 201 was taken apart and observed, and neither damage in the catalyst carrier 2 nor wind corrosion in the holding and sealing material 204 was found, and no trace of leakage of exhaust gas was found. In addition, no noise occurred during operation, and the catalyst carrier 2 was reliably held without being worn. That is, the catalytic converter 201 was not only easy to assemble but also had excellent performance.

Thus, the catalytic converter 201 of the ninth embodiment can bring about the following effects.

(1) The region P1 of which pack density is relatively higher than that of the low pack density region P2 is provided at the gas inlet end E1 in the holding and sealing material 204. Therefore, the progress of wind corrosion at the gas inlet end E1 can be delayed. Thus, catalyst holding performance of the catalyst carrier 2 and sealing performance of the gap portion will be maintained over a long period. Hence, a catalytic converter 201 can be obtained that hardly causes the catalyst carrier 2 to be worn and damaged, hardly allows exhaust gas to be leaked and being excellent in durability.

(2) The pack density of the low pack density region P2, the pack density of the high pack density region P1, the ratio between the width W1 and the length L1 of the holding and sealing material 204 and the width of the high pack density region P1 are each set in a suitable range. Therefore, satisfactory improvement in durability can be achieved while maintaining suitable assembling performance.

(3) The thick region 11 is provided at one edge of the holding and sealing material 204. Therefore, the cost for preparation can be reduced unlike conventional holding and sealing material formed by impregnating the entire mat material with an inorganic binder and sintering the same. In addition, the holding and sealing material 204 can easily be wound around the outer periphery 2a of the catalyst carrier 2, and has excellent assembling performance because the holding and sealing material 204 is deformable.

Tenth Embodiment

Figure 15A:
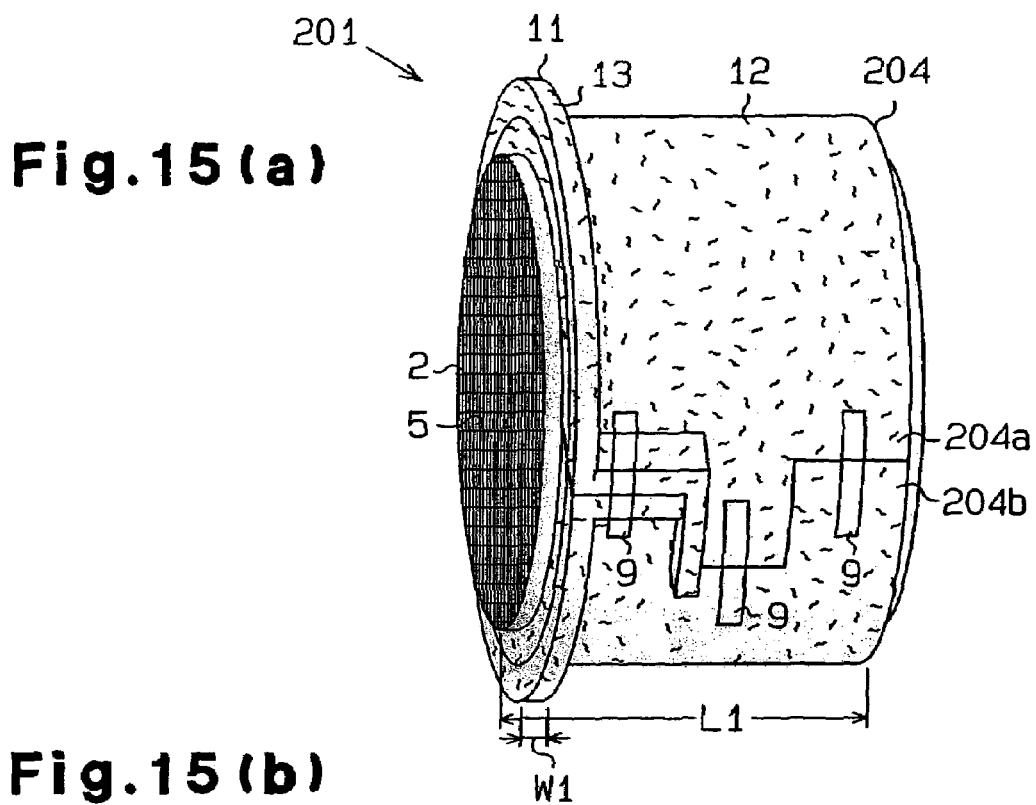
FIG. 15(a) is a perspective view of the catalyst carrier having the holding and sealing material according to a tenth embodiment of the present invention.
Figure 15B:
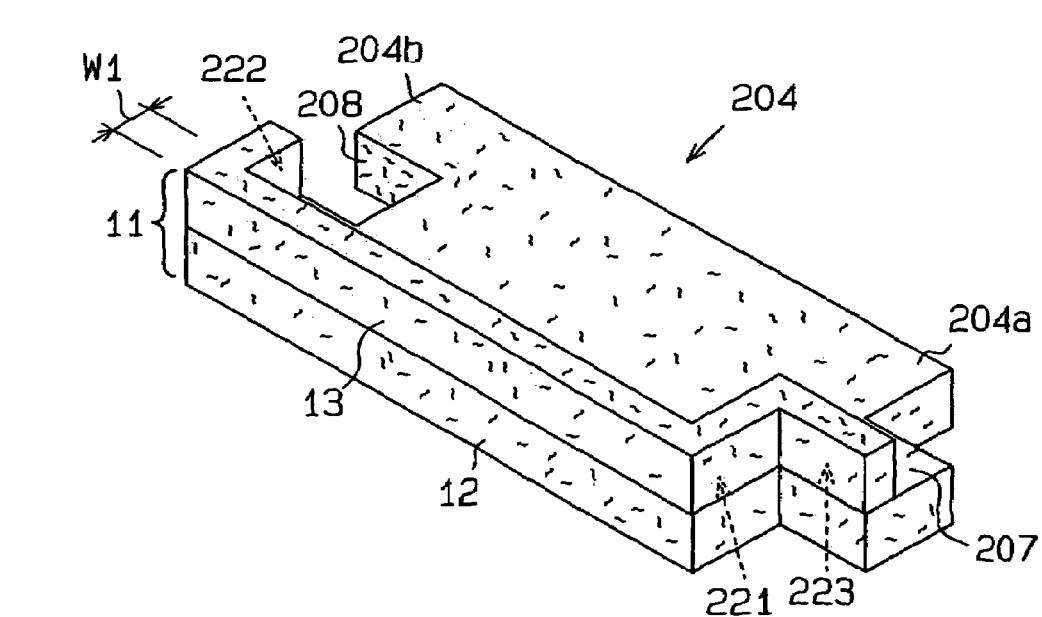
FIG. 15(b) is a perspective view of the holding and sealing material.

The catalytic converter 201 according to a tenth embodiment of the present invention will now be described based on FIGS. 15(a) and 15(b). Here, elements different from those of the ninth embodiment are mainly described, and descriptions of common elements are omitted with the same reference numerals assigned.

In the holding and sealing material 204 shown in FIGS. 15(*a*) and 15(*b*), the sub-holding and sealing material 13 is attached to a gas inlet area 221 of the mating end 204*a*, a gas inlet area 22 of the mating end 204*b* and a gas inlet edge 223 of the convex mating portion 207. Therefore, after assembly, the gas inlet areas 221 and 222 and the gas inlet edge 223 are compressed along the thickness and provided with the high pack density region P1.

Therefore, according to the tenth embodiment, the progress of wind corrosion can be delayed for the gas inlet areas 221 and 222 and the gas inlet edge 223, and thus a catalytic converter 201 is obtained having further excellent durability. Also, the holding and sealing material 204 is prepared by bonding the sub-holding and sealing material 13 on the main holding and sealing material 12. Therefore, even if the thick seal region 11 constituting the high pack density region P1 is bent as shown in FIG. 15(*a*), the holding and sealing material 204 can be formed relatively easily.

Eleventh Embodiment

The catalytic converter 201 according to an eleventh embodiment of the present invention will now be described based on FIGS. 16(*a*), 16(*b*) and 17. Here, elements different from those of the ninth embodiment are mainly described, and descriptions of common elements are omitted with the same reference numerals assigned.

Figure 16A:
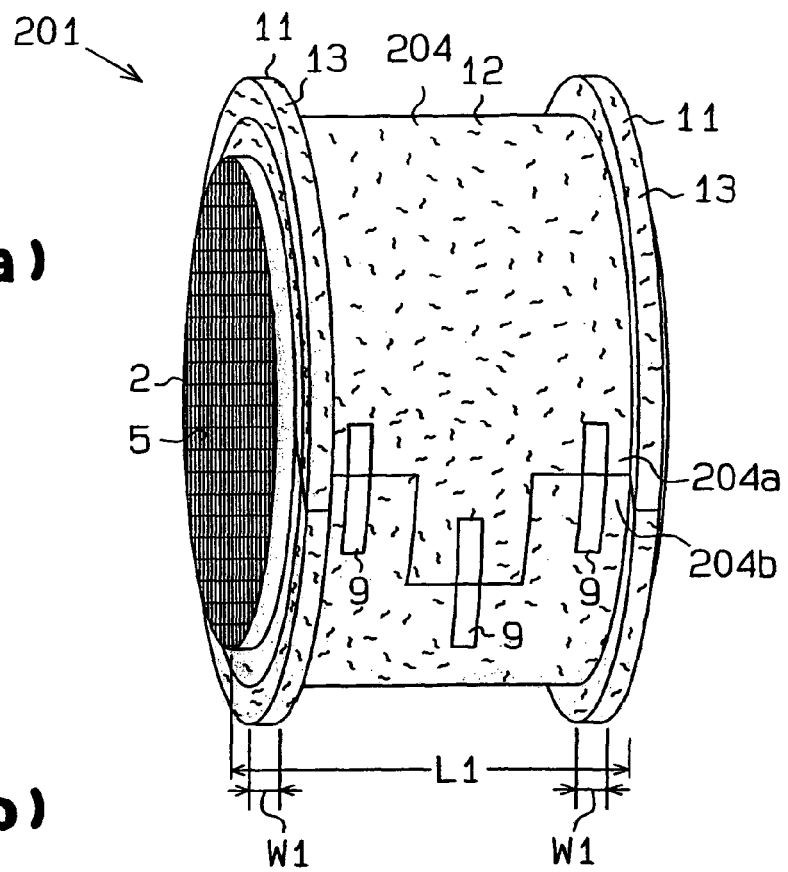
FIG. 16(a) is a perspective view of the catalyst carrier having the holding and sealing material according to an eleventh embodiment of the present invention.
Figure 16B:
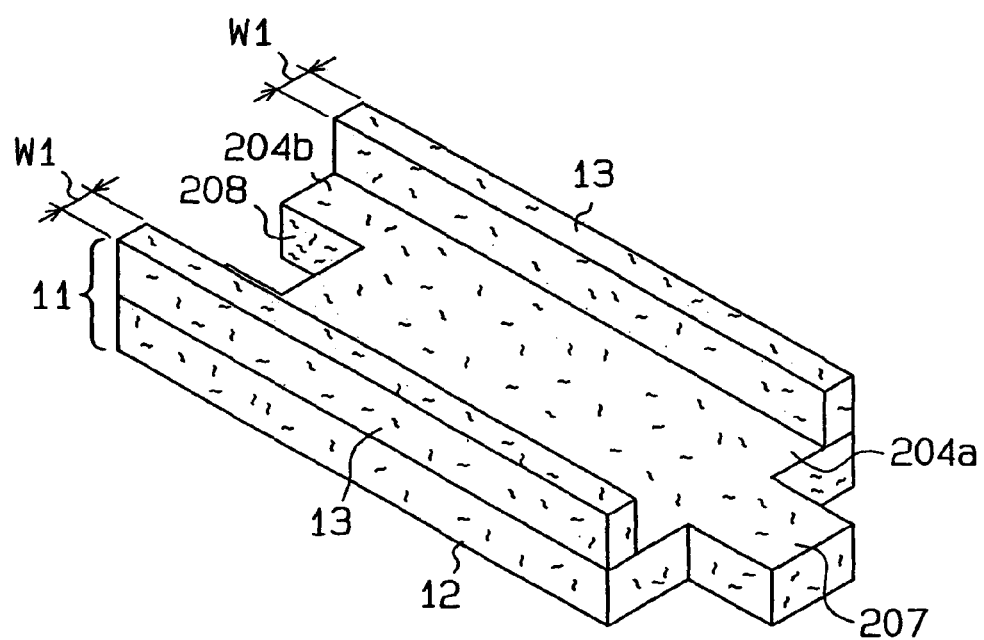
FIG. 16(b) is a perspective view of the holding and sealing material.

In the holding and sealing material 204, as shown in FIGS. 16(*a*) and 16(*b*), two sub-holding and sealing materials 13 are attached on one main holding and sealing material 12. Thus, the thick region 11 is provided at both edges of the holding and sealing material 204.

Figure 17:
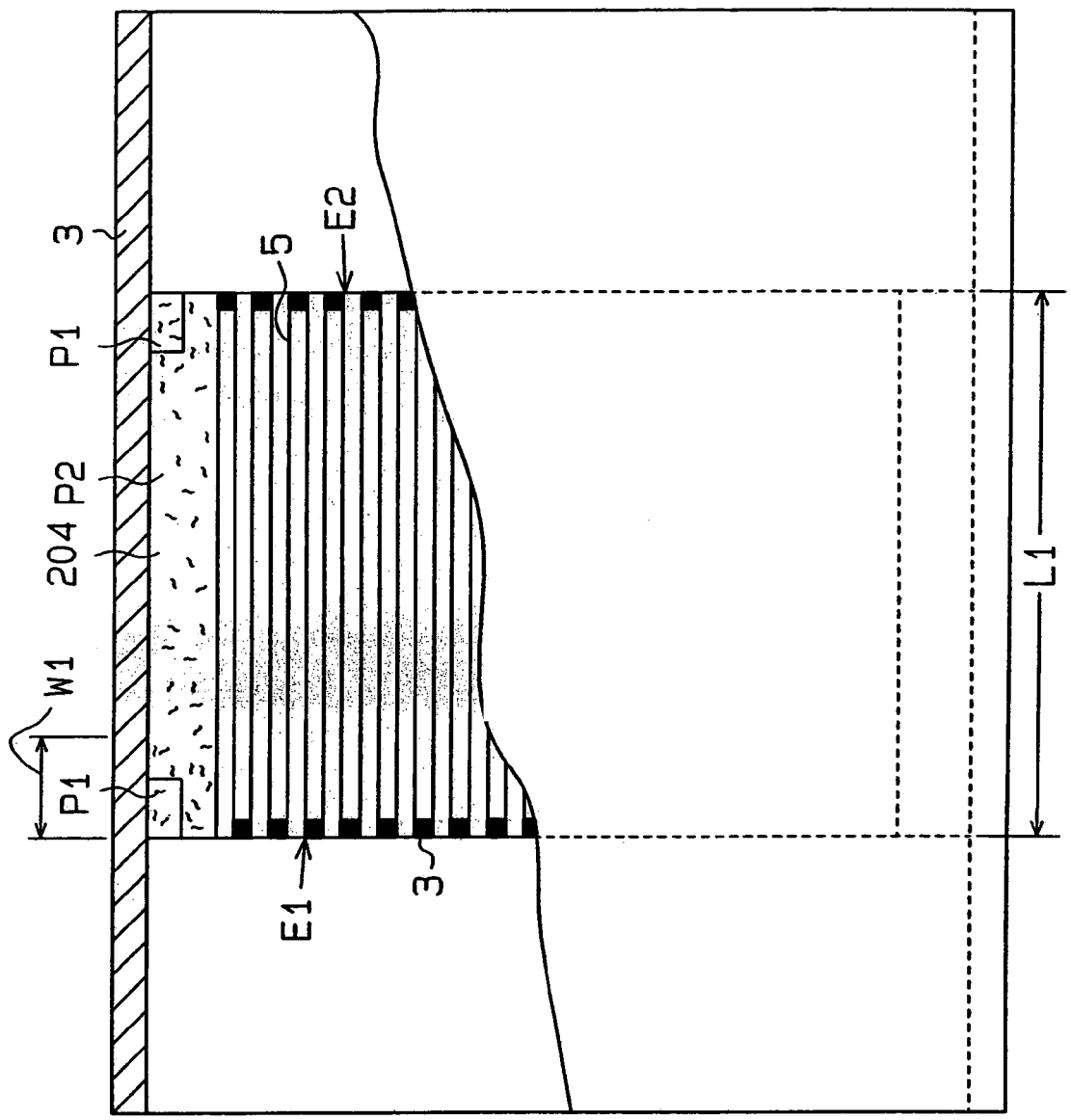
FIG. 17 is a sectional view of the catalytic converter according to an eleventh embodiment of the present invention.

Therefore, after assembly, a high pack density region P1 is formed at the gas outlet end E2 in addition to the gas inlet end E1 which is particularly susceptible to wind corrosion due to compression of two thick regions 11 (see FIG. 17). Therefore, the progress of wind corrosion can be reliably delayed, and thus the catalytic converter 201 even more excellent in durability can be obtained.

Twelfth Embodiment

Figure 18A:
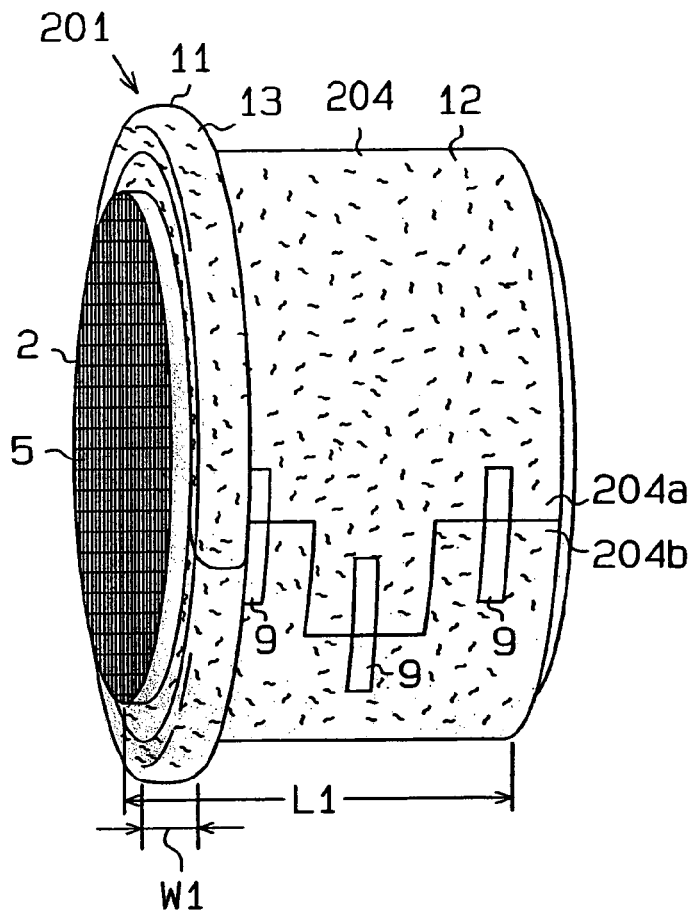
FIG. 18(a) is a perspective view of the catalyst carrier having the holding and sealing material in a twelfth embodiment of the present invention.
Figure 18B:
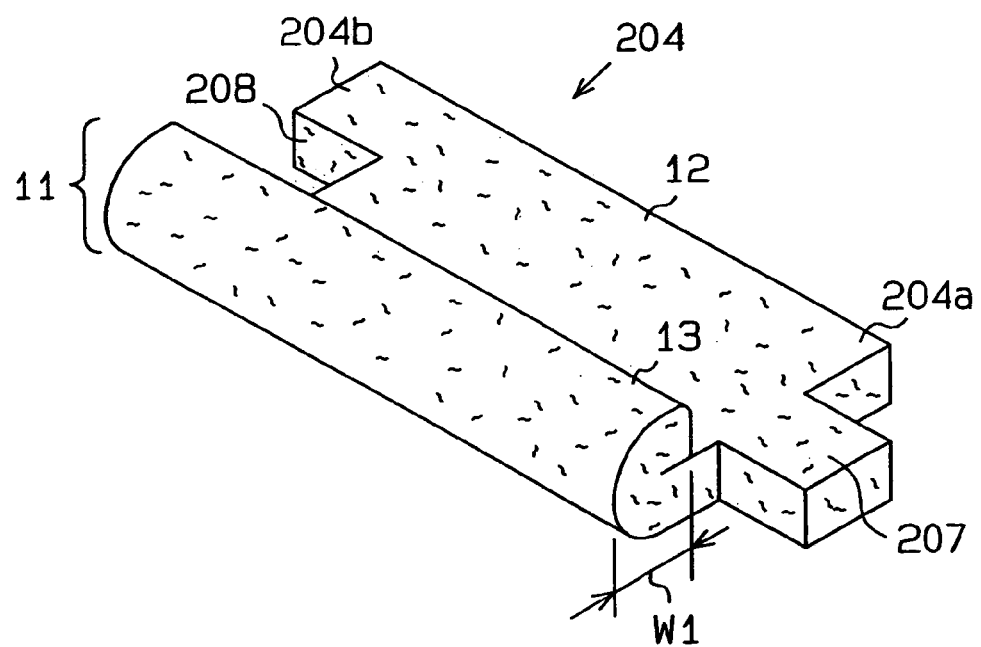
FIG. 18(b) is a perspective view of the holding and sealing material.
Figure 19:
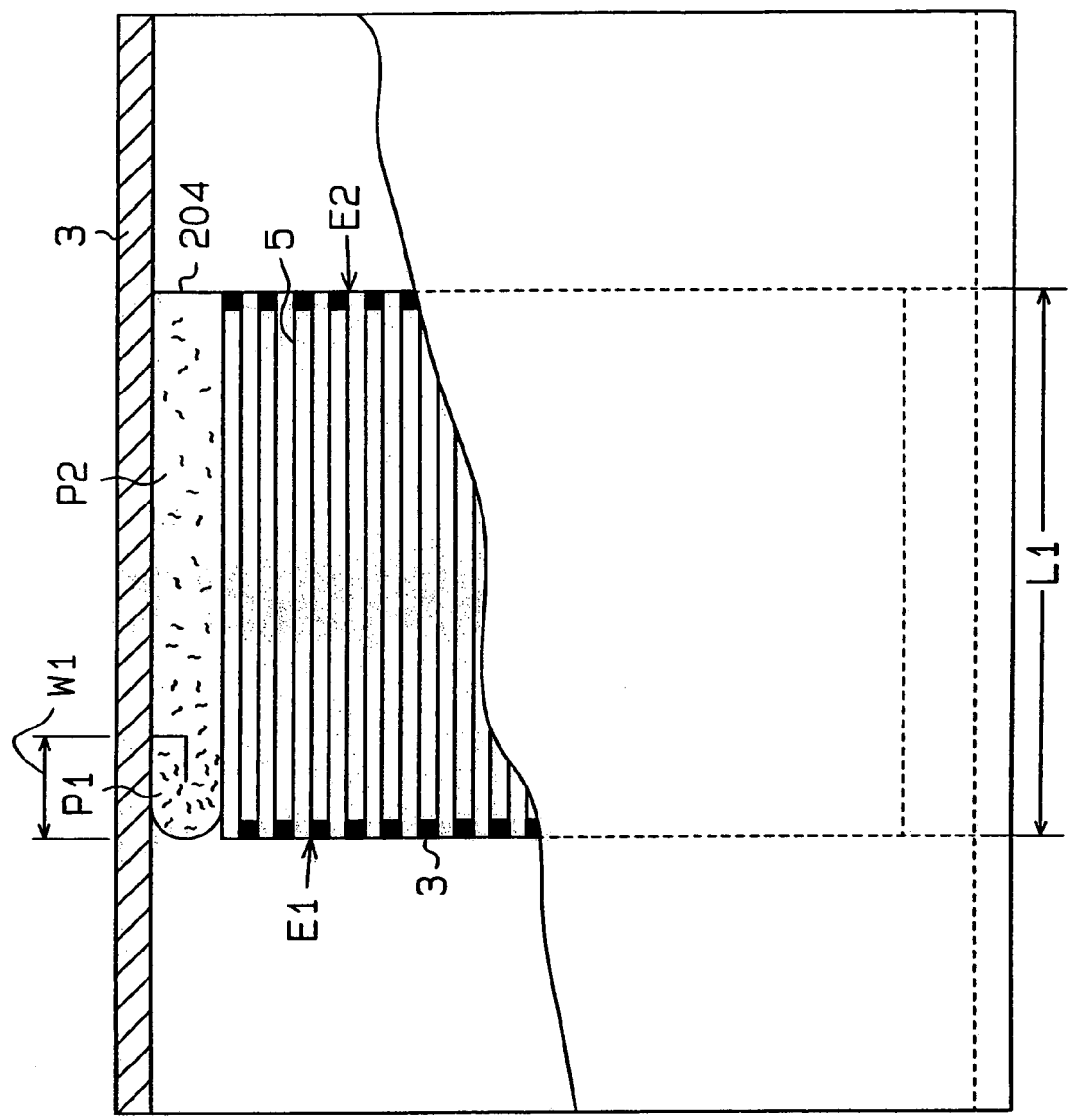
FIG. 19 is a sectional view of the catalytic converter of the twelfth embodiment of the present invention.
Figure 20:
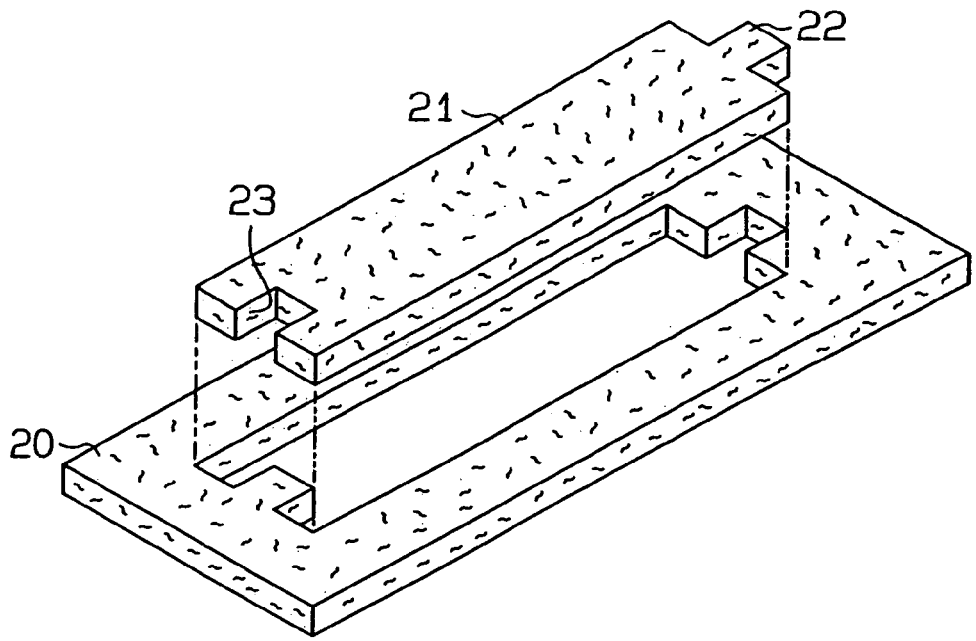
FIG. 20 is a perspective view illustrating a method for preparing the holding and sealing material in an example of prior art.
Figure 21:
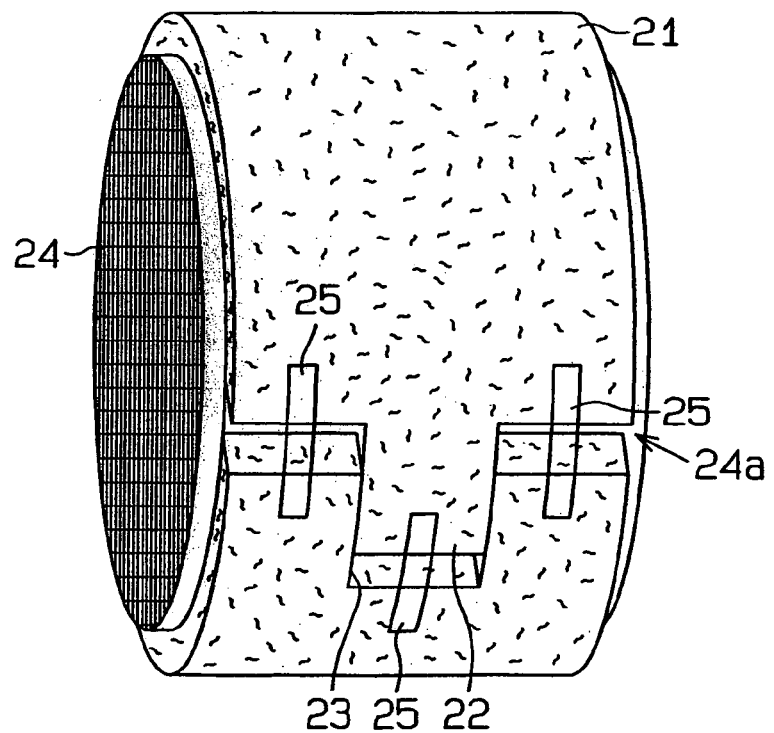
FIG. 21 is a perspective view of the catalyst carrier having the holding and sealing material of the example of the prior art.

The catalytic converter 201 according to a twelfth embodiment of the present invention will now be described based on FIGS. 18(*a*), 18(*b*) and 19. Here, elements different from those of the ninth embodiment are mainly described, and descriptions of common elements are omitted with the same reference numerals assigned.

In the twelfth embodiment, the holding and sealing material 204 is prepared by a method different from that of the ninth embodiment. That is, in the holding and sealing material 204, the thick region 11 having a thickness twice as large as that of the main holding and sealing material 12 is formed by bending the edge of the main holding and sealing material 12. Thus, the holding and sealing material 204 having the thick region 11 can be formed using only one main holding and sealing material 12 without the necessity to prepare a separate material corresponding to the sub-holding and sealing material 13.

Furthermore, the ninth to twelfth embodiments may be changed as follows.

In the case where the holding and sealing material 204 of the ninth embodiment is used to fabricate the catalytic converter 201, the holding and sealing material 204 may be wound with the sub-holding and sealing material 13 facing the outer periphery 2*a*.

The holding and sealing material is not limited to the holding and sealing material 204 of the ninth to twelfth embodiments, and for example, a holding and sealing material may be used having a simplified structure in which no mating portions 207 and 208 are provided.

The holding and sealing material 204 may be impregnated with an organic binder as a sub-material as long as deformability of the holding and sealing material 204 is not deteriorated.

The first to twelfth embodiments may be changed as follows.

The sectional form of the catalyst carrier 2 is not limited to being circular, and it may be, for example, elliptical or oblong. In this case, the sectional form of the metal shell 3 may be changed to be an ellipse or oblong.

The method for rolling-up the metal shell 3 with the catalyst carrier 2 disposed therein and fixing both ends to each other is not limited to welding, and other methods can be employed.

The present invention is implemented as the catalytic converter 1 for an automobile exhaust gas cleaning apparatus, but is not limited thereto, and may be applied to, for example, a diesel particulate filter (DPF) and a catalytic converter for a fuel cell modifying apparatus.

The invention claim is:

1. A holding and sealing material disposed in a gap between a catalyst carrier having an outlet periphery and a metal shell covering the outer periphery of the catalyst carrier in a catalytic converter, the holding and sealing material comprising:
a beltlike holding and sealing material havin opposing longitudinal edges and a width in the range of one-third to one-tenth of the length of said catalyst carrier, and wound around the outer periphery of said catalyst carrier by one turn or more; and
a pair of adhesive layers each formed at a respective one of said opposing longitudinal edges on one face of the holding and sealing material to bound the sealing material to the outer periphery of the catalyst carrier.

2. The holding and sealing material according to claim 1, wherein said holding and sealing material is longer than the circumference of said catalyst carrier.

3. The holding and sealing material according to claim 2, wherein said holding and sealing material is helically and continuously wound around the outer periphery of said catalyst carrier.

4. The holding and sealing material according to claim 3, wherein the ends of said holding and sealing material each have a width smaller than the width of the area exclusive of the ends of the holding and sealing material.

5. The holding and sealing material according to claim 3, wherein said holding and sealing material is wound around the outer periphery of said catalyst carrier such that one of adjacent edges is not superimposed on the other.

6. The holding and sealing material according to claim 3, wherein said holding and sealing material is wound around the outer periphery of said catalyst carrier such that a predetermined space is maintained between adjacent edges, and the area occupied by the wound portion of the holding and sealing material is 50 to 100% of the total area of the outer periphery of said catalyst carrier.

7. A holding and sealing material disposed in a gap between a catalyst carrier having an outer periphery and a metal shell covering the outer periphery of the catalyst carrier in a catalytic converter, the holding and sealing material comprising:

a belt-like holding and sealing material having opposing longitudinal edges and a width in the range of one-third to one-tenth of the length of said catalyst carrier, and is wound around the outer periphery of said catalyst carrier by two turns or more; and a pair of adhesive layers each formed at both a respective one of said opposing longitudinal edges on one face of the holding and sealing material to bond the sealing material to the outer periphery of the catalyst carrier.

8. A holding and sealing material disposed in a gap between a catalyst carrier having an outer periphery and a metal shell covering the outer periphery of the catalyst carrier in a catalytic converter, wherein the holding and sealing material is wound over a length equivalent to at least one turn around the outer periphery of said catalyst carrier such that one of longitudinal edges of the holding and sealing material is continuously superimposed on another one of the longitudinal edges along the longitudinal direction of the holding and sealing material, wherein said holding and sealing material is wound helically and continuously around the outer periphery of said catalyst carrier.

9. The holding and sealing material according to claim 8, wherein the superimposed area has a width of 5 mm to 15 mm.

10. The holding and sealing material according to claim 8, wherein the superimposed area is equal to or smaller than one-third the non-superimposed area.

11. The holding and sealing material according to claim 8, wherein said holding and sealing material has an adhesive layer provided on one surface of the holding and sealing material.

12. A catalytic converter comprising:

a catalyst carrier having an outer periphery and a gas inlet end;

a cylindrical metal shell covering the outer periphery of the catalyst carrier: and a holding and sealing material disposed in a gap between the catalyst carrier and the metal shell, said holding and sealing material comprising a thick portion provided on a surface of said holding and sealing material at the gas inlet end and extending along a circumference of said catalyst carrier by at least one turn around the outer periphery of said catalyst carrier with one of longitudinal edges of the holding and sealing material continuously superimposed on another one of the longitudinal edges, said thick portion filling the gap between the catalyst carrier and the metal shell after depositing the holding and sealing material in the gap therebetween, wherein said superimposing provides a superimposed area equal to or smaller than one-third of a non-superimposed area.

13. The holding and sealing material according to claim 12, wherein the height of said thick portion is equivalent to 1.1 to 2.0 times as large as the thickness of said holding and sealing material.

14. The holding and sealing material according to claim 12, wherein said holding and sealing material is wound around the outer periphery of said catalyst carrier and includes a region having a relatively high pack density and formed from the thick portion, said holding and sealing material having first and second mating ends and a convex mating portion provided at the first mating end and a concave mating portion provided at the second mating end, and said high pack density region being also provided in gas inlet areas at said first and second mating ends and an edge of said convex mating portion.

15. The holding and sealing material according to claim 14, wherein said holding and sealing material has a low pack density region having a pack density lower than that of said high pack density region, the pack density of said low pack density region being 0.20 g/cm$^3$ to 0.35 g/cm$^3$, and the pack density of said high pack density region being 0.35 g/cm$^3$ to 0.50 g/cm$^3$.

16. The holding and sealing material according to claim 14, wherein the width of said high pack density region is equivalent to one twentieth to one fifth the length of said catalyst camer.

17. The holding and sealing material according to claim 14, wherein the width of the high pack density region in said holding and sealing material is 5 mm to 30 mm.

* * * * *